(12) United States Patent
Ohtani et al.

(10) Patent No.: US 7,251,072 B2
(45) Date of Patent: Jul. 31, 2007

(54) OPTICAL TRANSMISSION SYSTEM

(75) Inventors: Toshihiro Ohtani, Hokkaido (JP); Tsukasa Takahashi, Hokkaido (JP); Eiji Ishikawa, Hokkaido (JP); Hiroto Ikeda, Hokkaido (JP); Hiroyuki Deguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 190 days.

(21) Appl. No.: 10/635,723

(22) Filed: Aug. 7, 2003

(65) Prior Publication Data

US 2004/0042063 A1    Mar. 4, 2004

(30) Foreign Application Priority Data

Aug. 27, 2002    (JP) .............................. 2002-246127

(51) Int. Cl.
   *H04B 10/17* (2006.01)
(52) U.S. Cl. ................................. 359/341.3
(58) Field of Classification Search .......... 359/341.41, 359/341.42, 341.3
   See application file for complete search history.

(56) References Cited

U.S. PATENT DOCUMENTS

| 6,038,063 A * | 3/2000 | Tsuda et al. ............ 359/341.41 |
| 6,396,625 B1* | 5/2002 | Nakaji .................... 359/341.41 |
| 6,751,013 B1* | 6/2004 | Wu ............................. 359/337 |
| 2002/0105715 A1 | 8/2002 | Naito et al. .................. 359/334 |

* cited by examiner

*Primary Examiner*—Jack Keith
*Assistant Examiner*—Ari M. Diacou
(74) *Attorney, Agent, or Firm*—Stass & Halsey LLP

(57) ABSTRACT

A reliable optical transmission system with an improved signal control mechanism that avoids abrupt power variations of light beams, thereby preventing optical supervisory channel (OSC) signals from experiencing errors. An optical amplifier amplifies main signals under the control of an optical amplifier controller, which spends a first predetermined time to raise the output power of the optical amplifier up to a desired level. A pump light source produces a pump beam for injection to a fiber-optic transmission line so as to make it serve as an amplifying medium. The pump light source is controlled by a pump light source controller that spends a second predetermined time to raise the pump beam to a desired power level. This stepwise start-up process of the amplifier power and pump beam power prevents OSC signals from experiencing abrupt power variations.

34 Claims, 26 Drawing Sheets

OPTICAL TRANSMISSION SYSTEM

BACKGROUND OF THE INVENTION

1. Field of the Invention

The present invention relates to an optical transmission system, and more particularly to an optical transmission system which transports optical signals over a long distance.

2. Description of the Related Art

As a core component of today's information and communication infrastructures, optical network systems are expected to provide more sophisticated services in wider geographical areas. Rapid technology developments have thus been made in this field to meet the future needs in advanced information-age societies. Of particular interest in recent years is repeaterless optical transmission systems. While transoceanic undersea cable systems require intermediary repeaters to compensate for their fiber-optic cable losses, repeaterless optical transmission techniques can be used in other long-haul applications such as continent-to-island or island-to-island communications systems. There is an increasing demand for reliable repeaterless systems because they are advantageous in both construction and service costs.

Wavelength division multiplex (WDM) systems are widely deployed as the mainstream technology of modern optical communication. WDM enables multiple signals to be carried by a single fiber-optic cable, multiplexing them in the wavelength domain. Besides transporting main information signals of 2.4 to 40 Gb/s, WDM systems have a monitoring signal channel of 1.5 to 150 Mb/s, which is called "Optical Supervisory Channel (OSC)." OSC signals are used to set up a system and monitor its operation status. More specifically, optical amplifiers in a transmission system are configured, monitored, and controlled by using an OSC channel. Another purpose of OSC is to detect a failure of optical transmission lines. Because of such usage, OSC signals do not pass through erbium-doped fiber amplifiers (EDFA) employed in many WDM systems (that is, EDFA is for main signals only). Also, because of their nature as the vehicle of control information, the OSC channel is given a relatively lower optical power level in order not to interfere with the main signals.

One solution to extend the cable length without using repeaters is to use a Raman amplifier. Raman amplifiers are known as an optical amplification technique suitable for long-distance, high-speed wideband optical transmission. They uses a physical phenomenon called stimulated Raman scattering. When a light enters into a substance that is vibrating, a part of the light is scattered with a shift of wavelength due to the vibration of that substance. With a sufficiently intense pump wave co-launched into a fiber-optic transmission line, the signal light gains energy from that pump wave, which accomplishes optical amplification. The peak of the Raman gain is obtained when the signal light has a wavelength offset of about 100 nanometers (nm) on the longer wave side. This means that a pump beam amplifies a signal wave whose wavelength is about 100 nm longer than the pump beam wavelength. For example, a 1450-nm pump beam is required to amplify a 1550-nm signal wave.

The above-described WDM transmission and Raman amplification techniques have been an active research area, and there are several proposals for Raman amplifier-based systems with a wider usable gain bandwidth. One such system is disclosed in the Unexamined Japanese Patent Publication No. 2002-229084, particularly in paragraphs 0019 to 0021 and FIG. 1.

In some conventional optical transmission systems, their OSC channel is assigned a relatively shorter wavelength band in the spectrum. This is applied to short-haul systems, as well as to long-distance systems that employ repeaters at short intervals. OSC signals in such systems are placed in a wavelength range of, for example, around 1510 nm, when main signals are arranged in the C-band (1535 to 1561 nm).

In long-haul repeaterless systems, on the other hand, their OSC channel is assigned a wavelength of 1570 to 1580 nm, where the fiber loss is lowest. Such systems have to make optical signals propagate over a distance of as much as 250 km, and an even longer haul is required in some of them. OSC signals are also supposed to reach the remote end even if the upstream optical transmitter amplifier and downstream Raman pump light source are both shut down, because, as mentioned above, they are necessary for the network operator to administrate the system. In other words, OSC signals have to save their power as much as possible during their long journey on the transmission line. This is why conventional systems allocate a lowest-loss wavelength band to their OSC channel.

Another attribute of repeaterless systems is their large power of information-carrying signals and Raman pump beams for the purpose of long-distance transport. More specifically, an optical amplifier at the sending end outputs one or more watts of power, which is more than six times as high as those in typical terrestrial systems. Likewise, a downstream Raman pump light source generates a beam of one to two watts, which is three to five times as high as those in typical terrestrial systems.

As can be seen from the above explanation, conventional repeaterless systems are designed to have an OSC channel with a wavelength that is longer than main signal wavelengths, as well as to produce high power beams with their optical amplifiers and Raman pump beam sources. Such system design, however, has the following problems:

(1) OSC Errors Caused by Amplifier Start-Up

Upon start-up, the system enables its upstream optical amplifier to output optical signals, which causes Raman amplification effects on the OSC signal. In that transient period, a sudden increase in the optical amplifier power produces an abrupt Raman gain variation, and the consequent change in the OSC signal level could be too large for an OSC circuit at the receiving end to follow, thus resulting in an OSC signal error.

(2) OSC Errors Caused by Pump Light Source Start-Up

Similar to the above problem (1), a sudden start-up of a downstream Raman pump light source causes an abrupt Raman gain variation, and the resulting change in the OSC signal level could be too large for the OSC receiver to follow, ending up with an OSC signal error.

(3) Lack of Stability in Recovery from APSD

High-power optical transmission systems have an automatic power shutdown (APSD) function, which prevents the human body from being exposed to hazardous light beams by automatically turns off optical amplifiers and other high-power light sources upon detection of a failure. When the system tries to recover from shutdown, an OSC error could happen in a transient period of that process just because of the reasons described in (1) and (2). This OSC error triggers the APSD mechanism, and the system should follow the same process again and again.

SUMMARY OF THE INVENTION

In view of the foregoing, it is an object of the present invention to provide a more reliable optical transmission system with an improved signal control mechanism that avoids abrupt power variations of transmitted light beams, thereby preventing OSC signal errors from happening.

To accomplish the above object, according to the present invention, there is provided an optical transmission system which transports optical signals over an optical transmission line. This system comprises an optical transmitter and an optical receiver. The optical transmitter comprises the following elements: an optical amplifier that amplifies main signals; and an optical amplifier controller that starts up the optical amplifier, spending a first predetermined time to raise output power of the optical amplifier up to a desired level, in order to prevent an OSC signal from experiencing abrupt power variations. The optical receiver comprises the following elements: a pump light source that produces a pump beam for injection to the fiber-optic transmission line so as to make the fiber-optic transmission line serve as an amplifying medium; and a pump light source controller that starts up the pump light source, spending a second predetermined time to raise the pump beam to a desired power level, in order to prevent the OSC signal from experiencing abrupt power variations.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
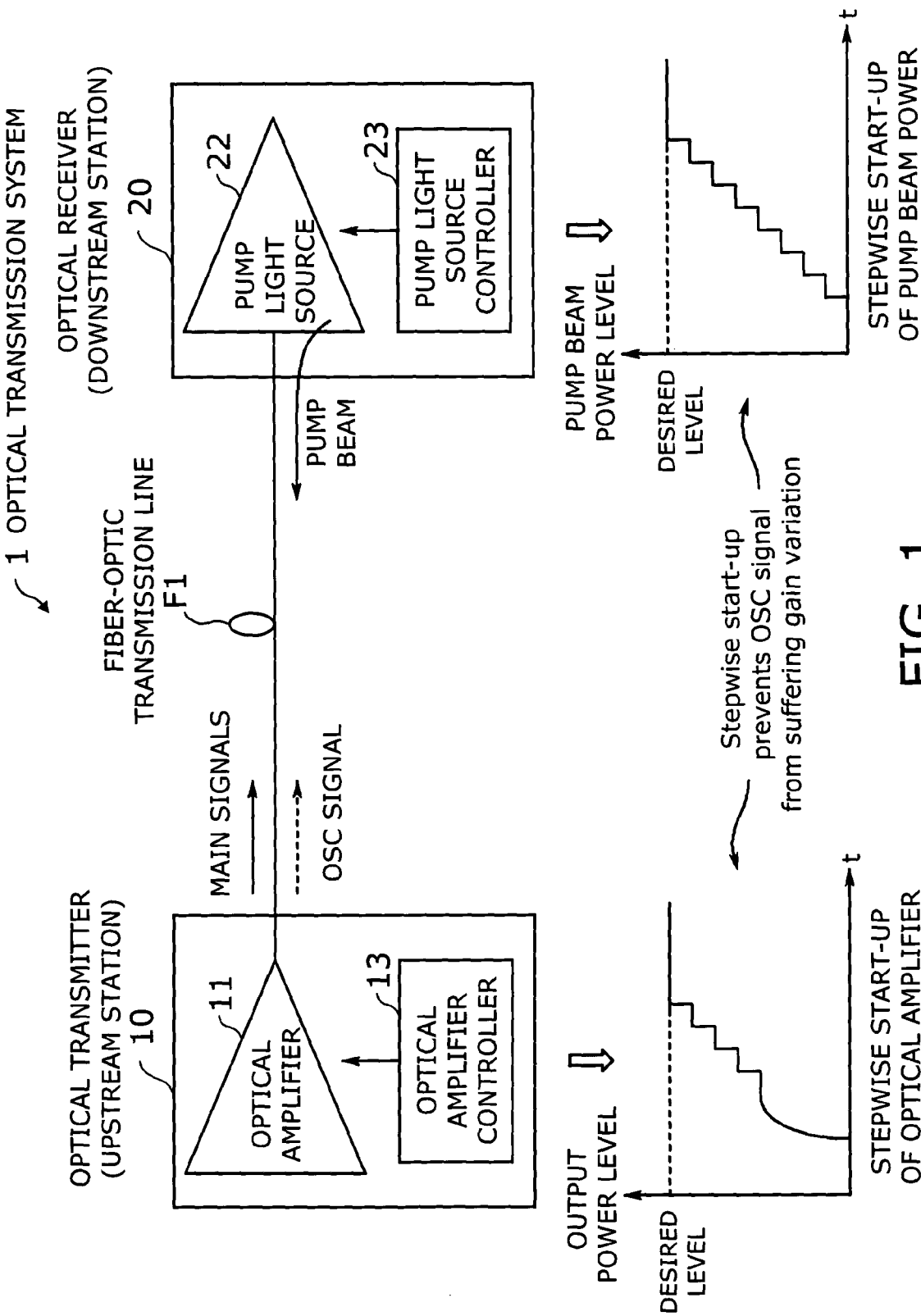
FIG. 1 is a conceptual view of an optical transmission system according to the present invention.

Preferred embodiments of the present invention will be described below with reference to the accompanying drawings, wherein like reference numerals refer to like elements throughout.

FIG. 1 is a conceptual view of an optical transmission system 1 according to the present invention. This system 1 is a long-haul repeaterless optical transmission system where an optical transmitter (or upstream station) 10 sends WDM optical signals to a remotely located optical receiver (or downstream station) 20 over a fiber-optic transmission line F1. While only one direction is illustrated in FIG. 1, the two end stations actually have both transmission and reception capabilities, so that the system 1 can transport signals in either direction. In other words, the illustrated elements and functions of the present invention can be integrated in a single device or a single station.

The optical transmitter 10 has an optical amplifier 11 and an optical amplifier controller 13. The optical amplifier 11 (e.g., erbium-doped fiber amplifier, or EDFA) amplifies main signals (i.e., information-carrying optical signals). The optical amplifier controller 13 controls the start-up operation of the optical amplifier 11, spending a predetermined time to prevent the OSC signal power from abrupt variations. That is, it gradually increases the output power of the optical amplifier 11 over a predetermined time period until it reaches a desired level. This process is referred to herein as "stepwise start-up."

The optical receiver 20 has a pump light source 22 and a pump light source controller 23. The pump light source 22 produces an optical beam to make a fiber-optic transmission line F1 serve as an amplification medium. Optical signals travelling over the fiber-optic cable are amplified optically through their interaction with the pump beam injected in the backward direction. This is known as the Raman amplification, and thus the pump beam will be referred to herein as a "Raman pump beam." The pump light source controller 23 controls the start-up operation of the pump light source 22, spending a predetermined time, not to cause abrupt variations of OSC signal power. That is, it gradually increases the Raman pump beam power over a predetermined time period until it reaches a desired power level. This process is also referred to herein as "stepwise start-up."

Figure 2:
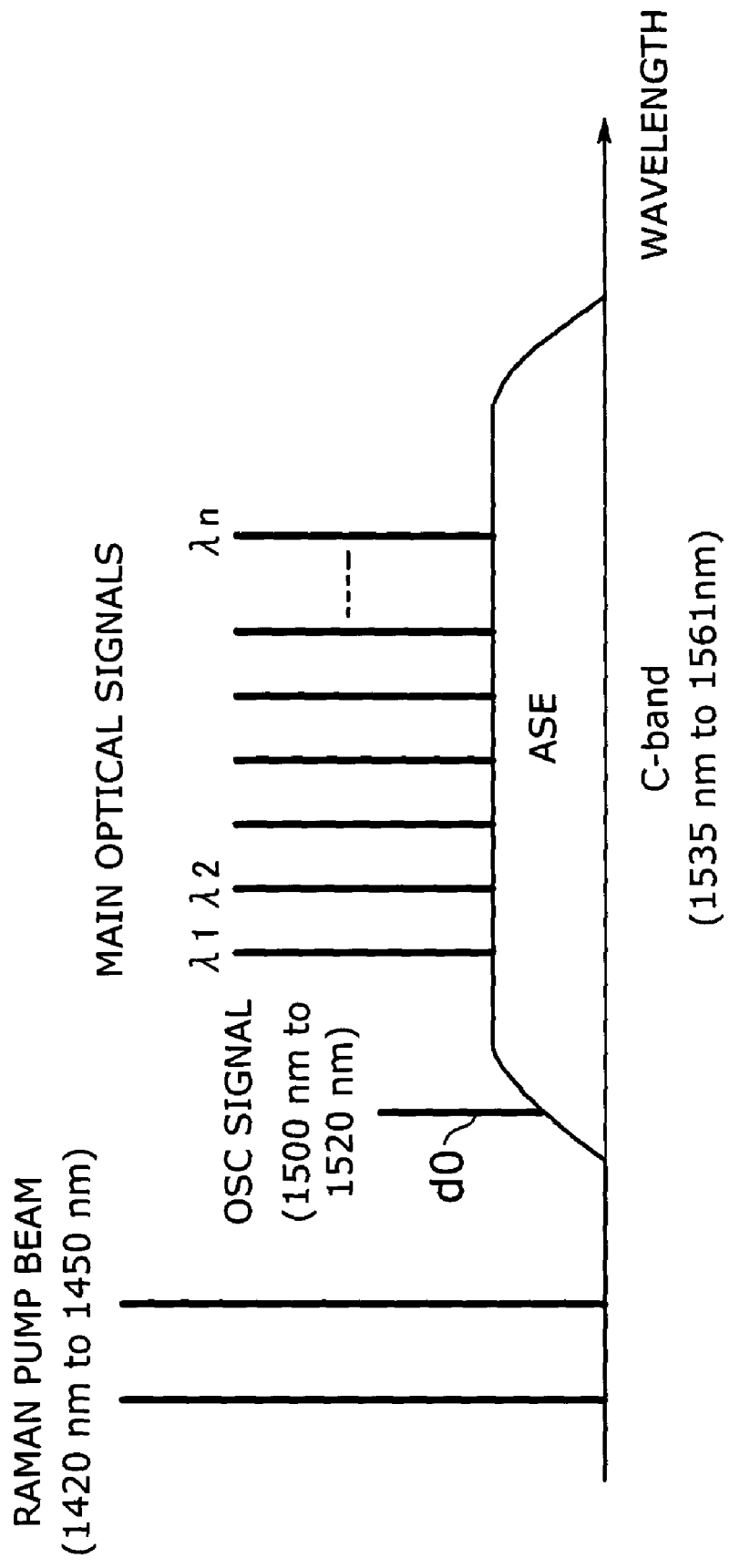
FIG. 2 shows schematically how optical wavelengths are used in the system.
Figure 3:
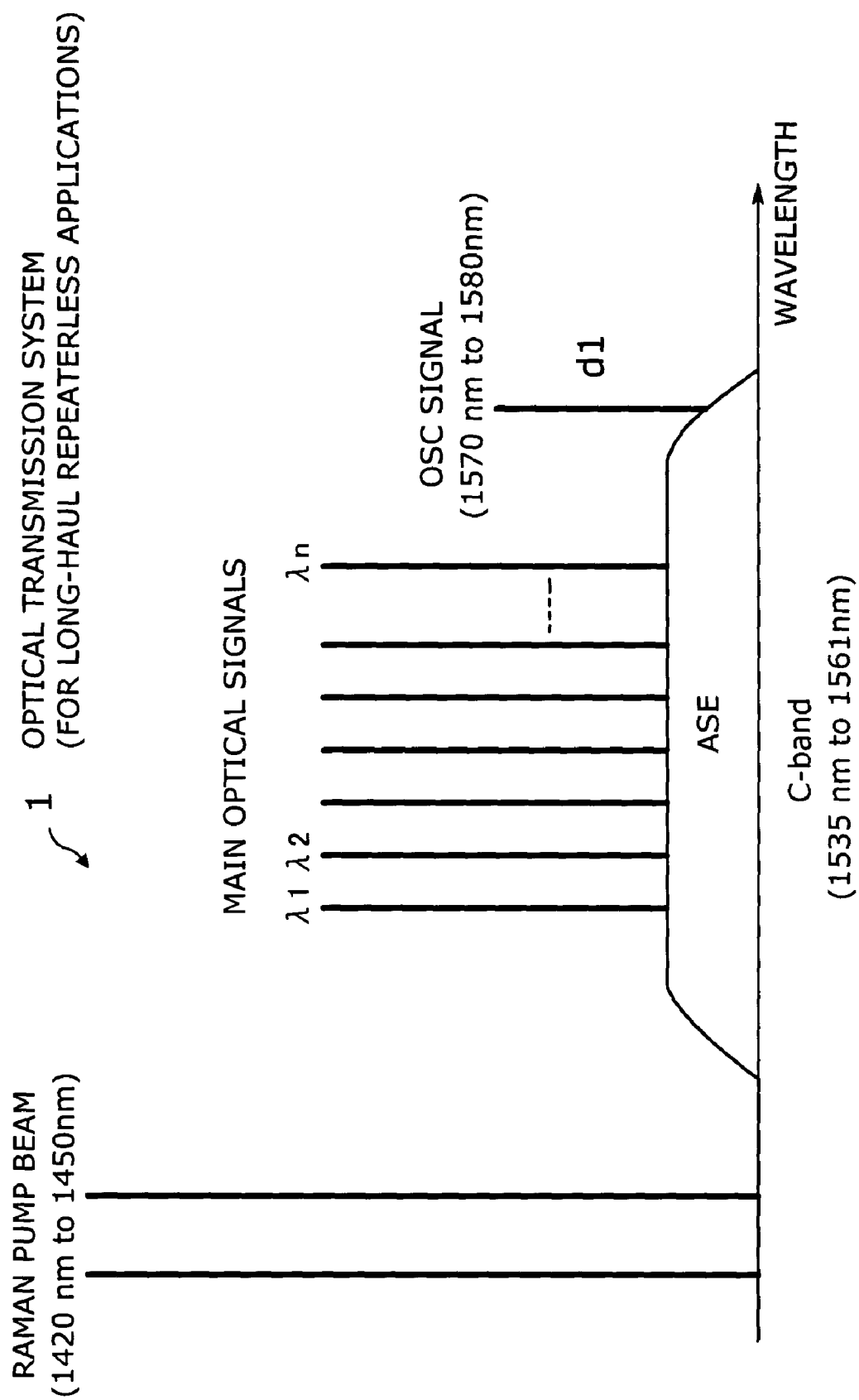
FIG. 3 is an another diagram that schematically shows how optical wavelengths are used in the system.

Before going into more specifics about the structure and functions of the proposed optical transmission system 1, we will elaborate what we intend to solve in the present invention, with reference to FIGS. 2 to 8. FIGS. 2 and 3 are spectrum diagrams that schematically show how optical wavelengths are used to transmit signals, FIG. 2 for a short-haul system 100 and FIG. 3 for a long-haul repeaterless system 1. Both optical spectrums contain a plurality of main signal components (main signal lights) with wavelengths ranging from $\lambda 1$ to $\lambda n$ and an OSC signal component, together with background noise components known as the "Amplified Spontaneous Emission (ASE)." The main optical signals lie in the C-band wavelength range of 1535 to 1561 nm. Both the short-haul system 100 and long-haul system 1 employ Raman amplifiers operating with a pump beam of 1420 to 1450 nm. Note that a plurality of wavelengths (two wavelengths in the present case) are used for pumping the C-band main signals because WDM systems require wide-band amplification. Generally, each end station in a system is equipped with a plurality of light sources to produce such multiple Raman pump beam components with different wavelengths.

One of the differences between the two spectrums of FIGS. 2 and 3 is the location of their OSC channels. OSC channel d0 in the short-haul system 100 uses a wavelength (e.g., 1500 to 1520 nm) that is shorter than those of the main signals. In the long-haul system 1, on the other hand, its OSC channel d1 is assigned a wavelength of, for example, 1570 to 1580 nm, where the fiber loss is lowest. The use of this wavelength, which is longer than the main signal wavelengths in C-band, aids the OSC signal to retain a sufficient power level when it reaches the receiving end.

Another difference is the magnitude of main optical signals and Raman pump beam. Compared to the short-haul system 100, the long-haul system 1 requires higher optical power levels in order to transport signals over a longer distance. Also note that OSC signal d1 is greater than its counterpart d0 in the short-haul system 100 because it is amplified as a result of the Raman effect with the main signals and pump beam, as will be discussed with reference to FIGS. 4 to 8.

Figure 4:
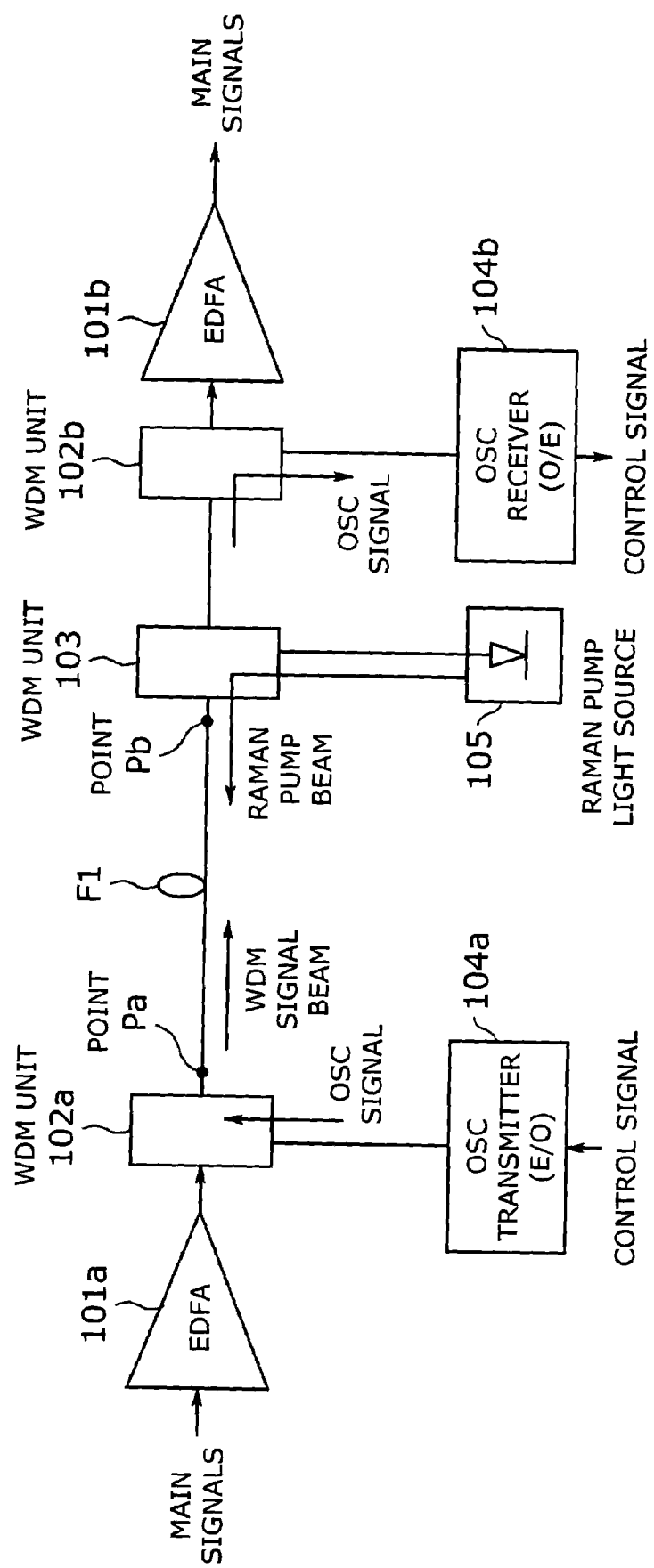
FIGS. 4 to 8 explains the effects of Raman amplification on OSC signals.
Figure 5:
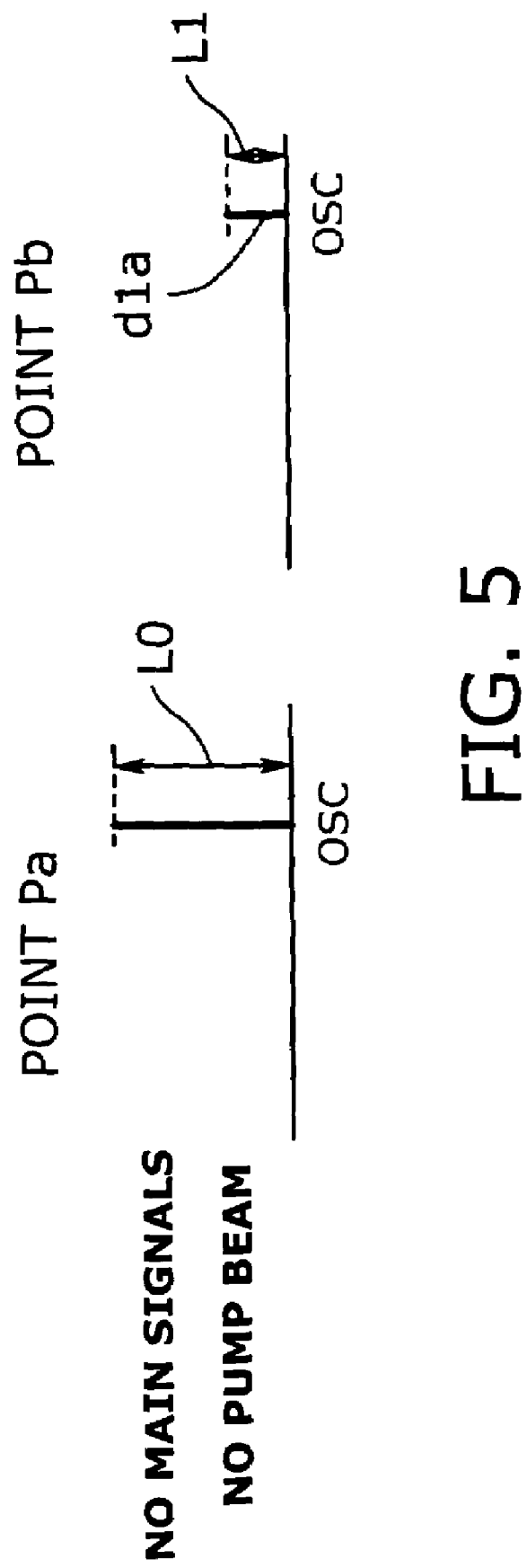
Figure 6:
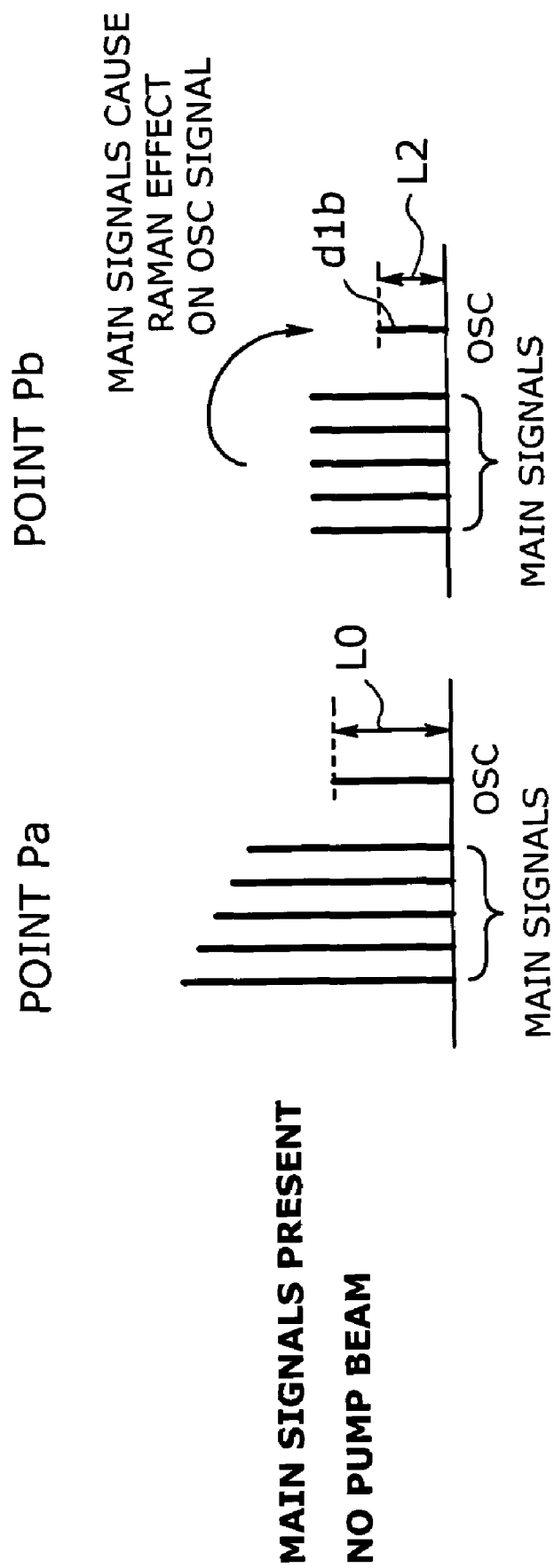
Figure 7:
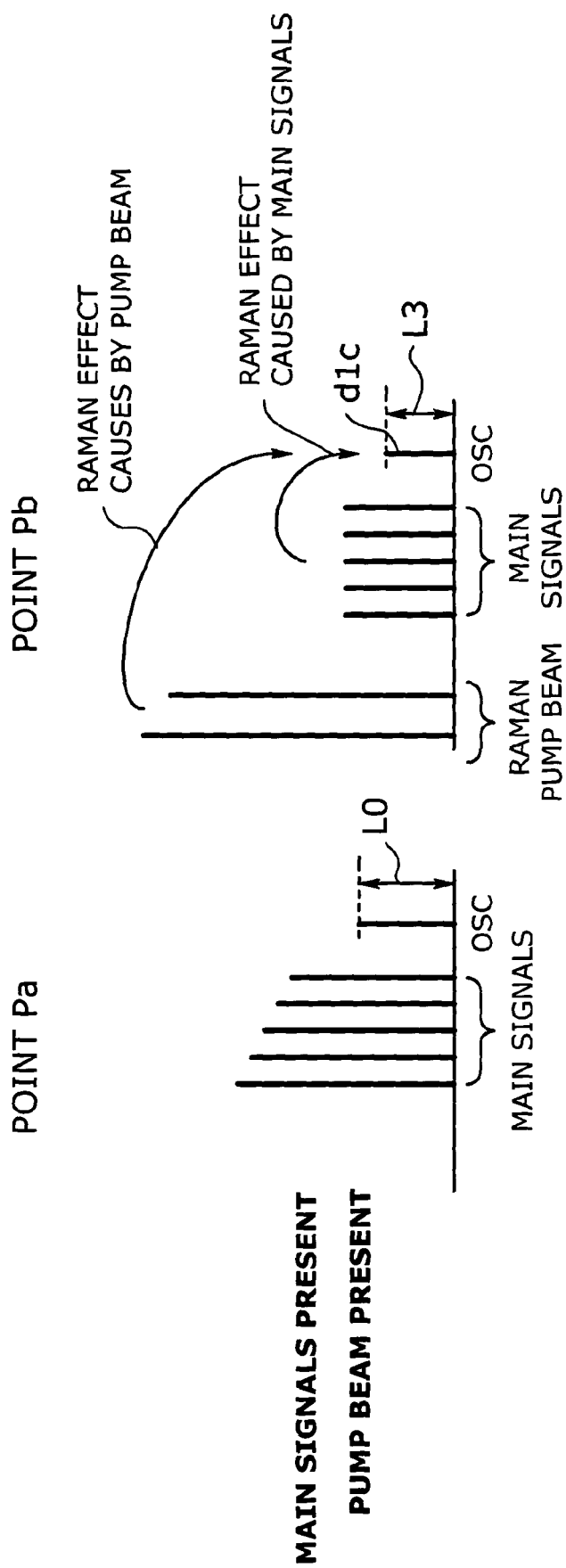

FIG. 4 illustrates an optical transmission system, which includes the following elements: a fiber-optic transmission line F1, optical amplifiers (EDFA) 101a and 101b, WDM units 102a, 102b, and 103, an OSC transmitter 104a, an OSC receiver 104b, and a Raman pump light source 105. The sending and receiving ends of the fiber-optic transmission line F1 are referred to point Pa and point Pb, respectively. In FIGS. 5 to 7, we will compare the magnitudes of optical signal components at these two points.

The optical amplifier 101a amplifies main signals, and the OSC transmitter 104a creates an OSC signal by converting a control signal to optical form. The WDM unit 102a combines the main signals and OSC signal into a single optical beam, thereby producing a WDM transmission signal. At the downstream station, the Raman pump light source 105 produces a Raman pump beam and sends it into the fiber-optic transmission line F1 through a WDM unit 103 toward the transmitting station, opposite in direction to the WDM signal beam. This backward Raman pumping amplifies the WDM signal beam travelling over the fiber-optic transmission line FIG. 1. Another WDM unit 102b splits the OSC signal component from the received WDM signal and routes it to the OSC receiver 104b. The remaining components (i.e., the main signals) are boosted by the optical amplifier 101b before they are sent to the subsequent stage. The OSC receiver 104b converts the received OSC signal into electrical form, thus reproducing the original control signal.

Figure 8:
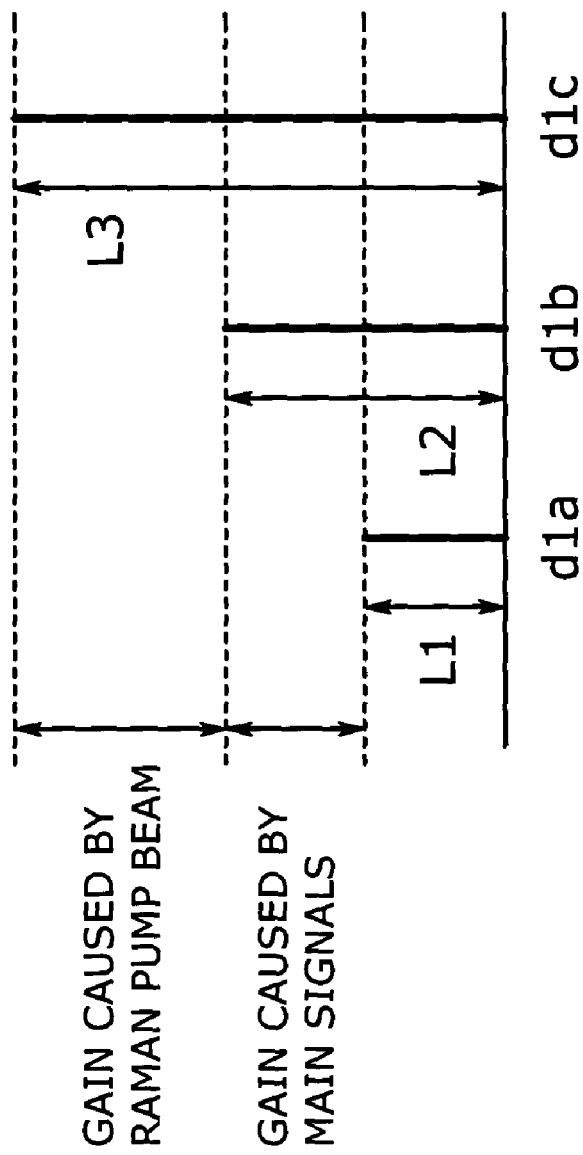

FIGS. 5 to 7 illustrate optical signal levels observed at points Pa and Pb on the fiber-optic transmission line shown in FIG. 4. FIG. 8 summarizes FIGS. 5 to 7, providing a comparison between the OSC signals d1a, d1b, and d1c at point Pb.

Specifically, FIG. 5 shows OSC signal levels when there are neither main signals nor Raman pump beam, the signal at point Pb being referred to by the symbol "d1a." As can be seen from this spectrum diagram, the OSC signal d1 attenuates due to fiber losses, from level L0 at point Pa to level L1 at point Pb.

FIG. 6 shows OSC signal levels in the case where the main signals are present, but there is no Raman pump beam. The signal at point Pb in this situation is referred to by the symbol "d1b," which has been attenuated from L0 (the original level at point Pa) to L2 due to the fiber loss. FIG. 8 shows that L2 is greater than L1 because of the Raman amplification effect caused by the main signal beam with a higher power. That is, the main signal light beam affects the OSC signal within the fiber medium, thus causing stimulated Raman scattering (a phenomenon where a shorter-wavelength light optically amplifies a longer-wavelength light). Because it has a wavelength that is longer than the main signal band, the OSC signal experiences Raman amplification effect in which the main signals serve as pump waves.

Also shown in FIG. 6 is a tilt of optical power levels that the upstream station gives when it sends out main signals; that is, short waves are transmitted at a higher power than long waves. This tilt at the sending end is necessary for the following reason. When multiple-wavelength signals travel over a long distance, shorter waves are attenuated more severely than longer waves, while the longer waves are amplified by the shorter waves because of a non-linear property of fiber-optic media (known as Raman effect). In an attempt to compensate for this gain distortion, the sending station provides an inverse curve of output signal power, thereby ensuring that the remote station can receive every optical signal at a similar level and with a sufficient S/N ratio.

FIG. 7 shows OSC signal levels in the case where both the main signals and Raman pump beam are present. The OSC signal at point Pb in this situation is referred to by the symbol "d1c," which has been attenuated from L0 (the original level at point Pa) to L3 due to the fiber loss. FIG. 8 shows that L3 is greater than L1 because of the Raman amplification effect caused by the main signals and pump beam. That is, three kinds of light beams (i.e., main signals, Raman pump beam, and OSC signal) interact with each other in the fiber medium, thus causing the stimulated Raman scattering. The OSC signal has a longer wavelength than the others, and it therefore experiences the Raman amplification effect, in which the main signals and Raman pump beam boost the OSC signal level. The Raman pump beam components at point Pb shown in FIG. 7 have an inverse tilt for the same purpose as that of the main signal tilt that we have explained in FIG. 6. That is, it is intended to compensate for larger attenuation of short pump lights, relative to that of long pump lights, during their travel through a fiber-optic cable.

As we have discussed in FIGS. 2 to 8, repeaterless transmission systems are different from normal repeatered systems in that they transmit main optical signals and Raman pump beam at a fairly higher power level, and in that their OSC signal has a longer wavelength than those of the main signals. This means that, in repeaterless systems, their OSC signals are likely to experience a greater degree of Raman amplification; i.e., it receives more power from the main signals and Raman pump beam. In other words, the Raman gain is greater in repeaterless systems than in repeatered systems.

A repeaterless system starts itself upon power-up, after insertion of new units, or in an attempt to recover from APSD activation (described later). At such a start-up phase of the system, the upstream optical amplifier may raise its output in a very short time, e.g., in the order of several hundred milliseconds. If this is the case, the OSC signal level will be affected by an abrupt increase of Raman amplification gain. The resulting high power level of the OSC signal could exceed the tolerance of the OSC receiver, although it is designed to accept such sudden changes to a certain extent. This excessive variation of OSC signal levels could lead to a signal reception error at the receiving end, causing a degradation in service quality and reliability of the optical transmission control.

The same problem occurs in the Raman pump light source in the downstream station. That is, the OSC signal would experience an abrupt increase of Raman amplification gain due to a sudden start-up of the Raman pump light source. The resulting high power level of the OSC signal could exceed the tolerance of the OSC receiver, which leads to an error in the optical transmission control at the receiving end, causing a degradation in service quality and reliability. According to our experiments, the OSC signal level exhibits a variation as intense as about 12 dB, when the main signal strength is about 28 dBm at the optical amplifier output, and the Raman pump beam is about 28 dBm.

Another problem of repeaterless systems is related to their automatic power shutdown (APSD) function. APSD is a safety measure for protecting a human body from injury, or preventing a fire hazard from happening, in case of disconnection or breakage of fiber-optic cables. When such a fiber fault is detected, the APSD function automatically shuts down the relevant optical amplifiers and Raman pump light sources in order not to allow a high-power light beam to leak out from the broken point.

Figure 9:
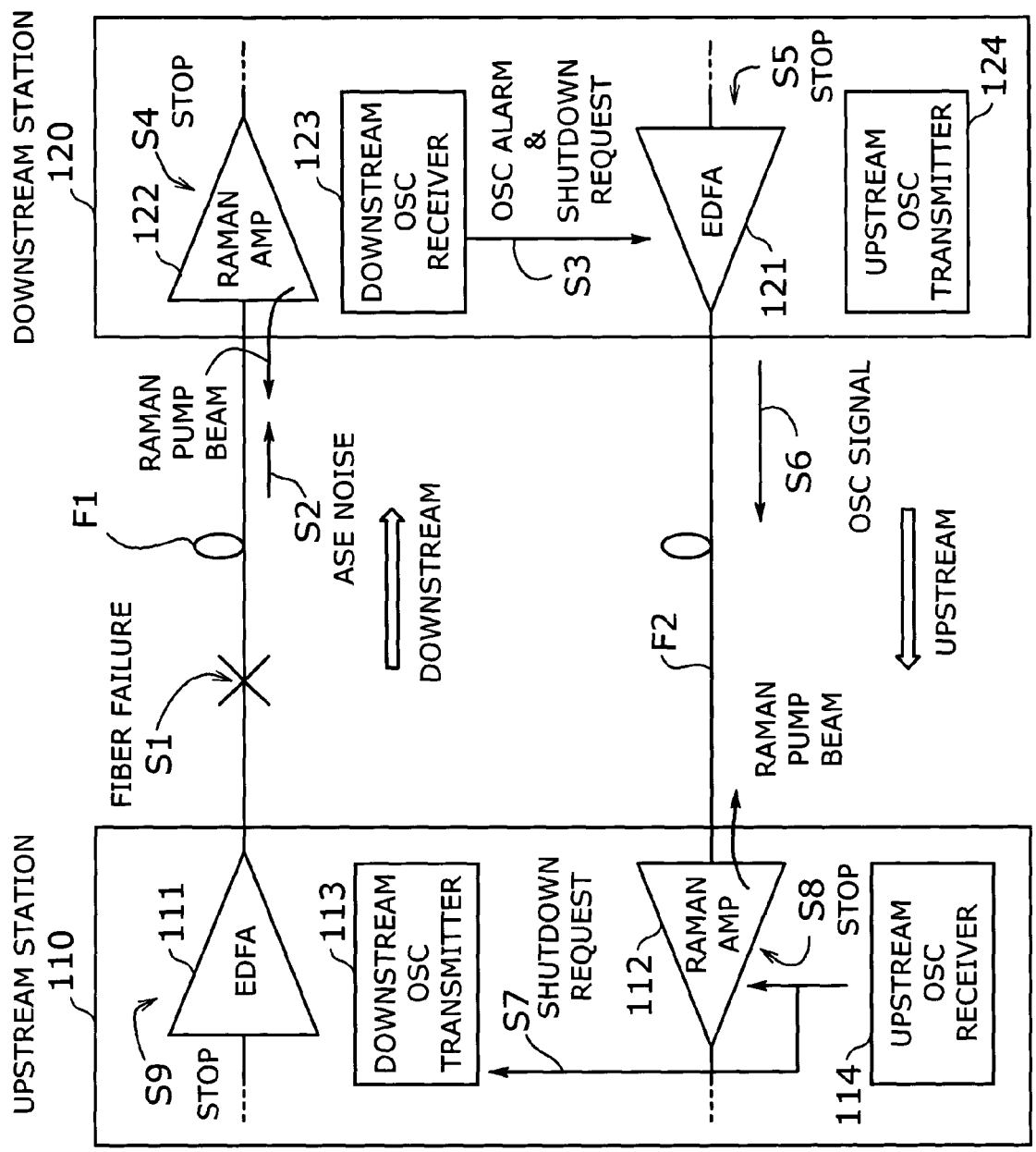
FIG. 9 shows how APSD operates.

FIG. 9 shows how the APSD operates. The illustrated system has an upstream station 110 and a downstream station 120. The upstream station 110 contains an optical amplifier (EDFA) 111 and a downstream OSC transmitter 113 as part of its downstream link facility, as well as a Raman amplifier (Raman pump light source) 112 and an upstream OSC receiver 114 as part of its upstream link facility. The downstream station 120, on the other hand, contains a Raman amplifier 122 and a downstream OSC receiver 123 as part of its downstream link facility, as well as an optical amplifier (EDFA) 121 and an upstream OSC transmitter 124 as part of its upstream link facility. The two end stations 110 and 120 are interconnected by a downstream fiber-optic transmission line F1 and an upstream fiber-optic transmission line F2. FIG. 9 depicts the following sequence of steps:

(S1) A fiber failure occurs in somewhere on the downstream fiber-optic transmission line F1.

(S2) The Raman pump beam is still available on the downstream side of the fiber-optic transmission line F1, since the fiber failure does not affect directly the Raman amplifier 122 in the downstream station 120. The pump beam thus amplifies ASE components, and the downstream station 120 receives this amplified noise.

(S3) At the downstream station 120, the downstream OSC receiver 123 can only detect incoming noise components, thus recognizing it as an OSC error. The downstream OSC receiver 123 then generates an OSC alarm and a shutdown request signal.

To achieve the above, the downstream OSC receiver 123 is designed to check each received OSC signal frame, including data integrity, clock recovery, and optical signal level. If any of those tests fails, it generates an error signal.

(S4) The shutdown request signal causes the Raman amplifier 122 to stop its operation.

(S5) The shutdown request signal also disables the optical amplifier 121.

(S6) Upon receipt of the OSC alarm, the upstream OSC transmitter 124 in the downstream station 120 produces an OSC signal containing that information and sends it out over the upstream fiber-optic transmission line F2.

(S7) In the upstream station 110, the upstream OSC receiver 114 generates a shutdown request upon arrival of the OSC signal transmitted at step S6.

(S8) The shutdown request signal makes the Raman amplifier 112 stop its operation.

(S9) The shutdown request signal also disables the optical amplifier 111.

All the upstream and downstream amplifiers are shut down through the above sequence. Then the OSC power level becomes stable, and the error is removed. When restart conditions are satisfied, the system attempts to return to its normal operation state. If the amplifiers turned on their outputs at once in this transitional period, the OSC signal level would suddenly rise because of the reasons explained above in FIGS. 2 to 8. An OSC error could happen again, bringing the system back to the APSD state. In that case, the system would repeat the following pattern: APSD-->recovery sequence-->OSC signal error-->APSD-->(and so on). The system is unable to restart correctly, causing problems in the quality and reliability of optical transmission service.

As can be seen from the above explanation, repeaterless optical transmission systems may suffer OSC errors that are caused by an abrupt gain variation of the Raman amplification effect on their OSC signal, which has a longer wavelength than main signals. Such a gain variation occurs because the main signals and Raman pump beam rapidly go up to their normal power levels when the system is powered up or recovered from APSD conditions.

Regarding the spectral arrangement of optical wavelengths, the OSC signal is likely to be located in a wavelength range of 1570 to 1580 nm, in which the fiber loss is minimum. This arrangement is suitable for repeaterless systems because they generally have a very large amount of transmission loss and it is thus reasonable to assign a minimum-loss channel to the OSC signal if possible.

Future systems are expected to operate with a higher optical power for transmitting main signals, as well as to amplify them with a Raman pump beam, so as to extend the length of the repeaterless section. This means that their OSC signals would be affected more severely by the power of main signals and pump beams. The present invention has been made to ensure the quality and reliability of optical transmission service by solving the problem of abrupt gain variations that could cause OSC signal errors. In the next section, we will describe the detailed operation of the proposed optical transmission system 1. Because the system architecture is symmetric in terms of transmission directions, we will concentrate on the downstream direction (i.e., we assume that main signals flow from an upstream station 110 to a downstream station 120) in the following explanation.

Figure 10:
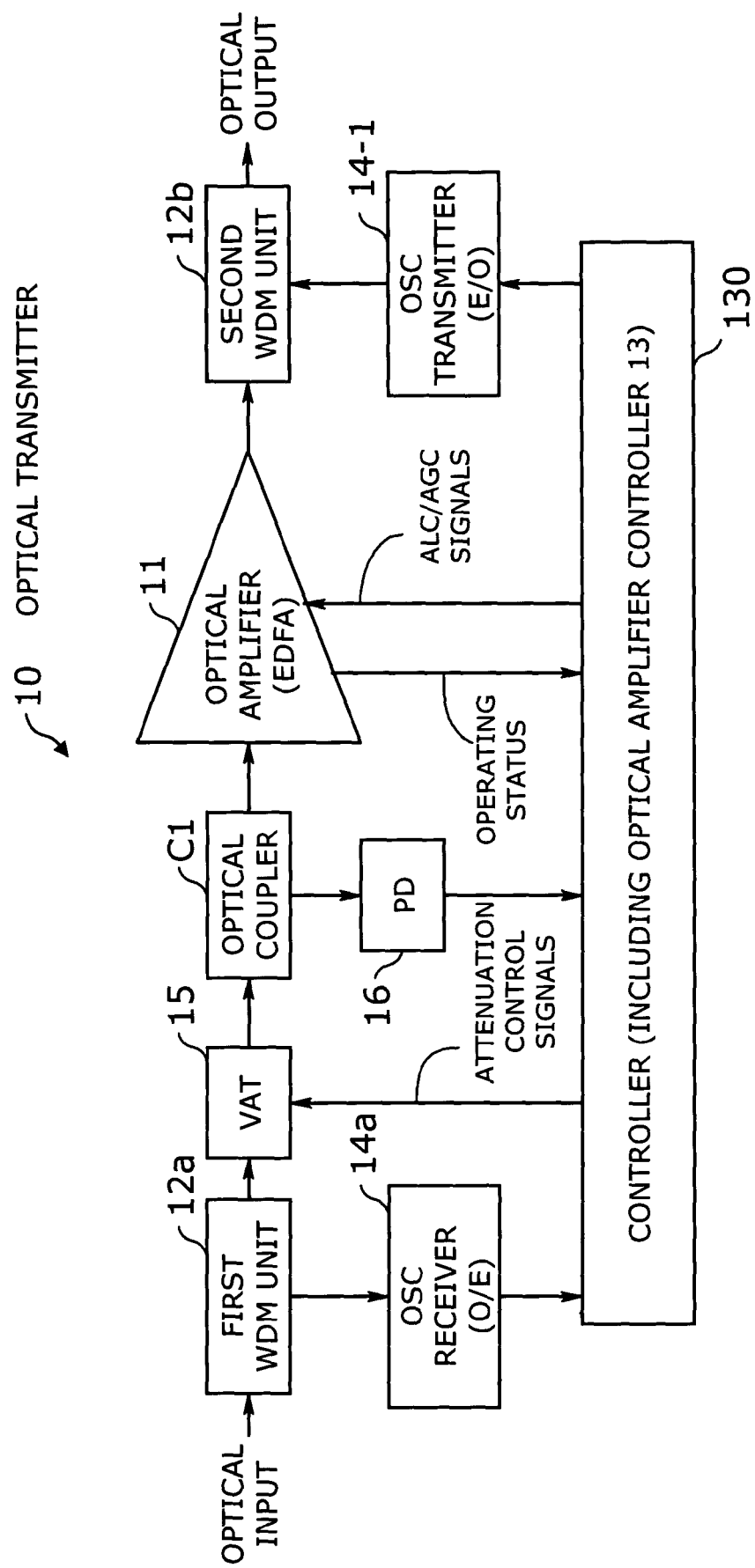
FIG. 10 is a block diagram showing an optical amplifier and its surroundings.

According to the present invention, the proposed system is designed to raise the amplifier power in a stepwise fashion. FIG. 10 is a block diagram of the optical transmitter 10, including an optical amplifier 11 and its surrounding circuits. The illustrated optical transmitter 10 comprises the following components, other than the optical amplifier 11: first and second WDM units 12a and 12b, an OSC receiver 14a, an OSC transmitter 14-1, a variable optical attenuator (VAT) 15, a photodiode (PD) 16, an optical coupler C1, and a controller 130. The controller 130 includes the function of the optical amplifier controller 13 that we have explained in FIG. 1.

The first WDM unit 12a receives a wavelength division multiplexed signal and splits an incoming OSC signal off from the received signal. It sends the OSC signal to the OSC receiver 14a, while supplying the remaining optical components (main signals) to the variable optical attenuator 15. The OSC receiver 14a converts the optical OSC signal into an electrical signal for use in the controller 130. The controller 130, containing a CPU or a Field Programmable Gate Array (FPGA), controls the optical transmitter 10 in its entirety.

The variable optical attenuator 15 sets its attenuation level according to attenuation control signals given by the controller 130. The optical coupler C1 divides the main signals into two parts, one for the optical amplifier 11 and the other for the photo diode 16. The photo diode 16 converts such main signals to electrical form so that the controller 130 can receive them.

The optical amplifier 11 amplifies the main signals for transmission. The optical amplifier 11 reports its own operating status to the controller 130, while receiving therefrom automatic level control and automatic gain control (ALC/AGC) signals. The OSC transmitter 14-1 performs electrical-to-optical conversion of an outgoing OSC signal supplied from the controller 130. The second WDM unit 12b combines the resultant optical OSC signal with the main signals from the optical amplifier 11, thus outputting a wavelength division multiplexed signal.

As a distinctive feature of WDM amplification, the optical amplifier 11 is controlled in both ALC and AGC modes. In ALC mode, the controller 130 tries to regulate the output power level of the optical amplifier 11 in the case the input level is varied. That is, when there is an incoming light of whatever level, the amplifier gain is varied so that the output power will be constant. In AGC mode, on the other hand, the controller 130 tries to keep the amplifier gain at a desired value, and thus the output power level may vary, depending on the input level. WDM transmission systems implement both ALC and AGC modes to make their optical amplifiers work as intended. More specifically, the optical transmitter 10 is designed to start up the optical amplifier 11 in ALC mode, determine a suitable gain value, then switches the operation from ALC mode to AGC mode, and maintain the set gain during normal operation.

Figure 11:
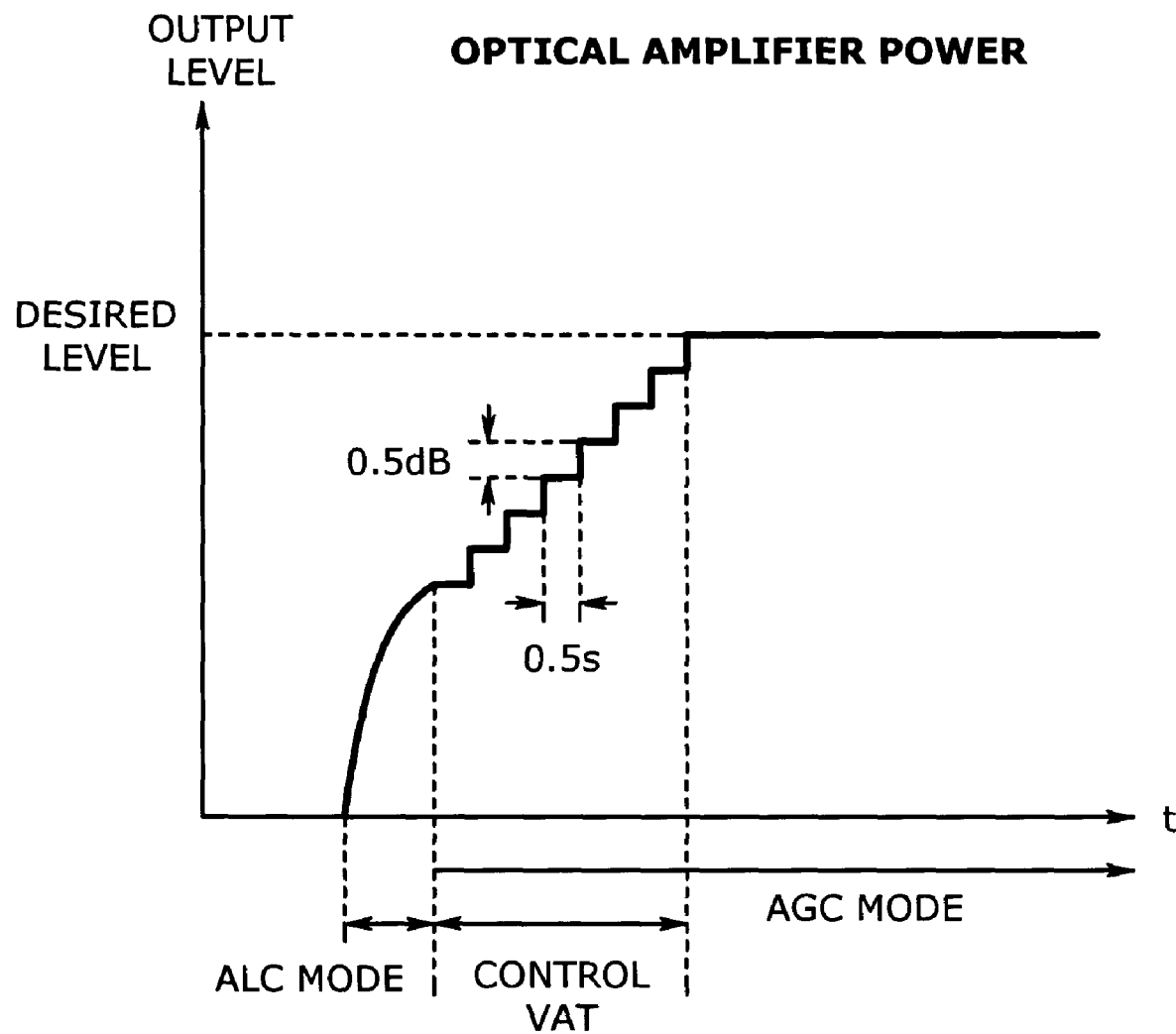
FIG. 11 shows how the output power of an optical amplifier ramps up in a stepwise manner.

According to the present invention, the optical amplifier 11 is controlled in such a way that its output power will ramp up in a stepwise fashion. FIG. 11 shows an example of how this is achieved using ALC and AGC modes, where the vertical axis represents the optical amplifier 11's output level and the horizontal axis represents the time. The optical amplifier 11 in ALC mode raises its output gradually from zero to a certain power level according to the ALC/AGC control signal given from the controller 130 shown in FIG. 10. The optical amplifier 11 then enters to AGC mode, and the controller 130 now changes the attenuation control signal to reduce the attenuation level of the variable optical attenuator 15 little by little. The output power thus rises in a stepwise fashion (e.g., by 0.5 dB every 0.5 s) as shown in FIG. 11 until it reaches a desired final value.

As described above, the ALC mode allows the controller 130 to directly specify the output level of the optical amplifier 11, and with this feature, the controller 130 can produce a moderate increase of output power, avoiding abrupt start-up of the optical amplifier 11. Once the gain is set to a certain value in AGC mode, the controller 130 begins to control the variable optical attenuator 15, thereby providing a further stepwise increase of the output power. In this way, the controller 130 keeps the OSC signal from sudden gain variations.

Figure 12A:
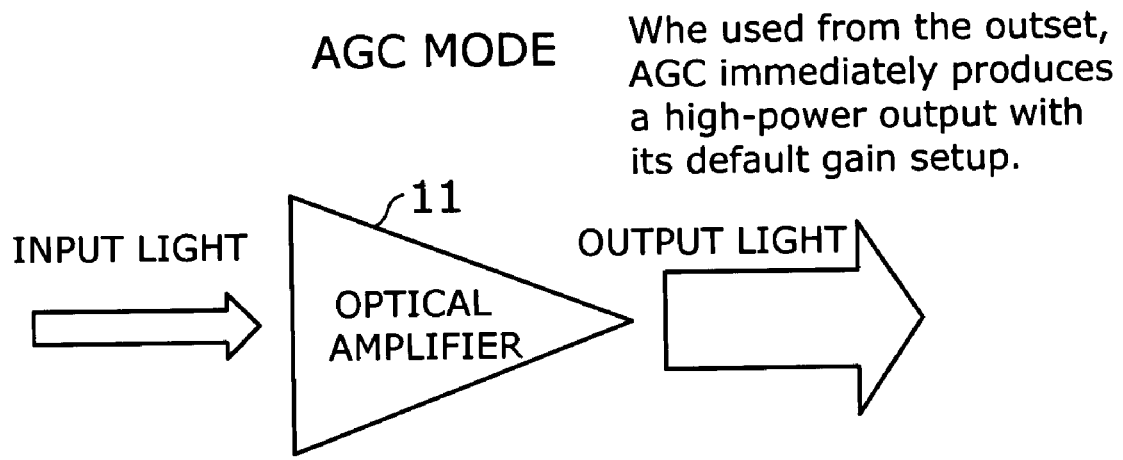
FIGS. 12(A) and 12(B) show two control modes of an optical amplifier.
Figure 12B:
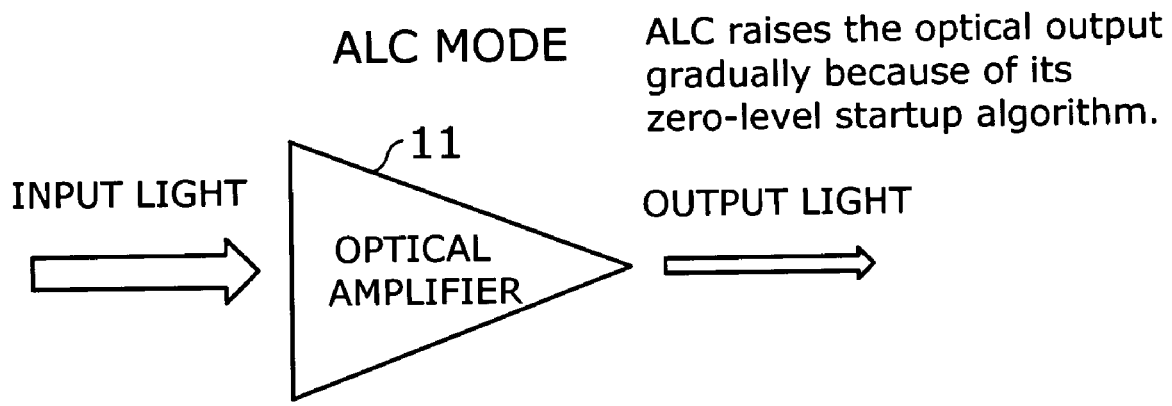

The optical amplifier 11 may be controlled using only the AGC mode to achieve a similar result. FIGS. 12(A) and 12(B) show how it behaves in AGC mode and ALC mode, respectively, when a certain amount of input light is available. With AGC mode alone, the optical amplifier 11 starts to operate with its default gain. In this case, a high-power light beam appears at its output port instantly upon start-up, as shown in FIG. 12(A). In contrast, the ALC mode operation shown in FIG. 12(B) offers a mild profile of output power levels because the ALC algorithm is designed to start up from zero level; it never produces abrupt bursts of optical power.

The above comparison between AGC mode and ALC mode suggests the use of the variable optical attenuator 15 from the outset when only AGC mode is used to control the optical amplifier 11. More specifically, the controller 130 initially sets the variable optical attenuator 15 to its maximum attenuation (i.e., the optical path is completely closed) and then reduces the attenuation level gradually by changing the attenuation control signals. The output power of the optical amplifier 11 ramps up in this way, without causing abrupt gain variations of the OSC signal.

We have exemplified two control methods for the optical amplifier 11, one with both ALC and AGC modes and the other with AGC mode alone. For simplicity of explanation, let us assume the use of the former method (ALC/AGC mode) in the rest of the description.

Figure 13:
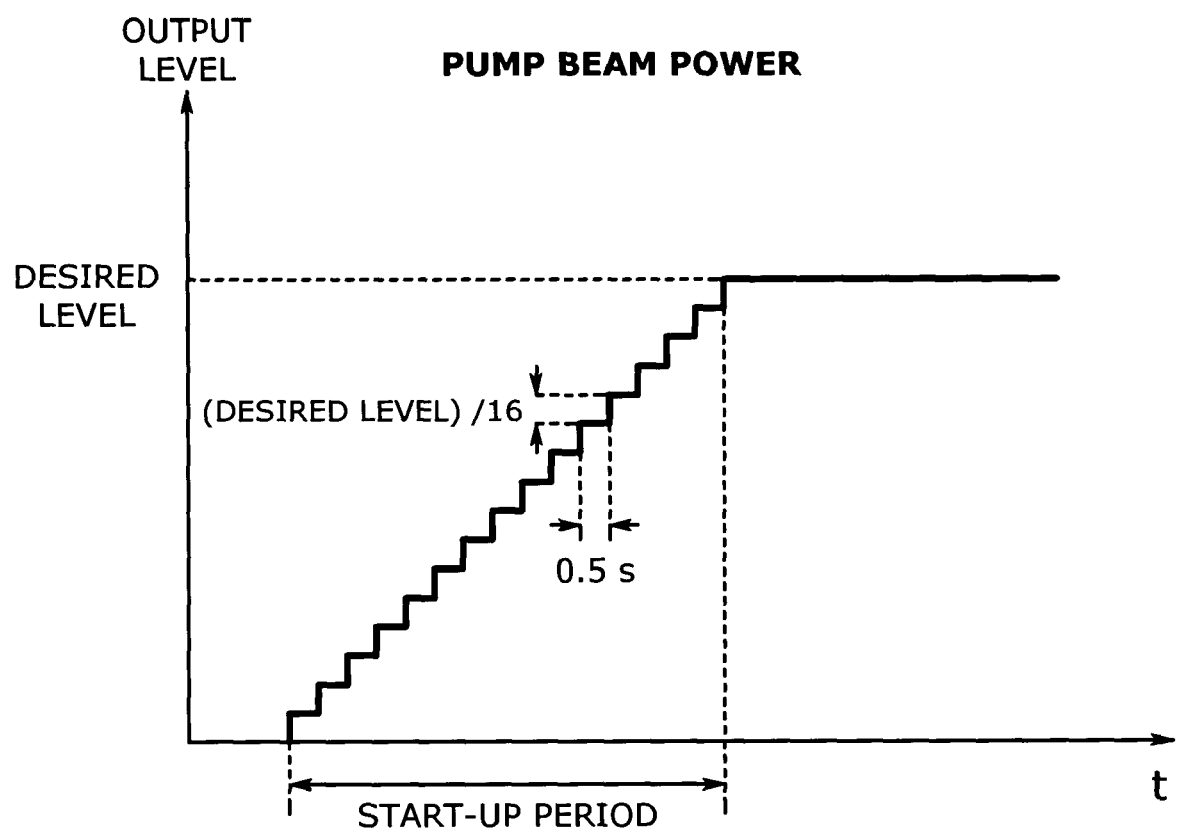
FIG. 13 shows how the Raman pump light source ramps up its output power.

Referring next to FIGS. 13 to 22, we will describe how the proposed optical transmission system raises Raman pump beam power, together with optical amplifier power, in a stepwise fashion. First, FIG. 13 shows how the pump light source 22 ramps up its output power, where the vertical axis represents the level of a Raman pump beam and the horizontal axis represents the time. As can be seen from this diagram, the pump light source 22 gradually increases its output level until it reaches a desired final value. In the present example, the desired level is divided into sixteen steps, the pump light source 22 is controlled in such a way that its output power level will increase from zero level to the full level, one step at a time, without imposing any abrupt gain variations on the OSC signal.

The optical amplifier 11 and pump light source 22 turn on their outputs individually as have been described in FIGS. 11 and 13. There needs to be a difference in their timings because it is more likely that concurrent start-up of those two outputs leads to a sudden change in the OSC signal gain. To avoid this problem, according to one aspect of the invention, the optical transmission system 1 is configured to sequentially enable its optical amplifier 11 and pump light source 22 with a certain time difference as will be described below. There are two methods for achieving such staggered start-up operations; one is to use a timer for controlling the timings, and the other is to use an OSC channel to exchange status information.

Figure 14:
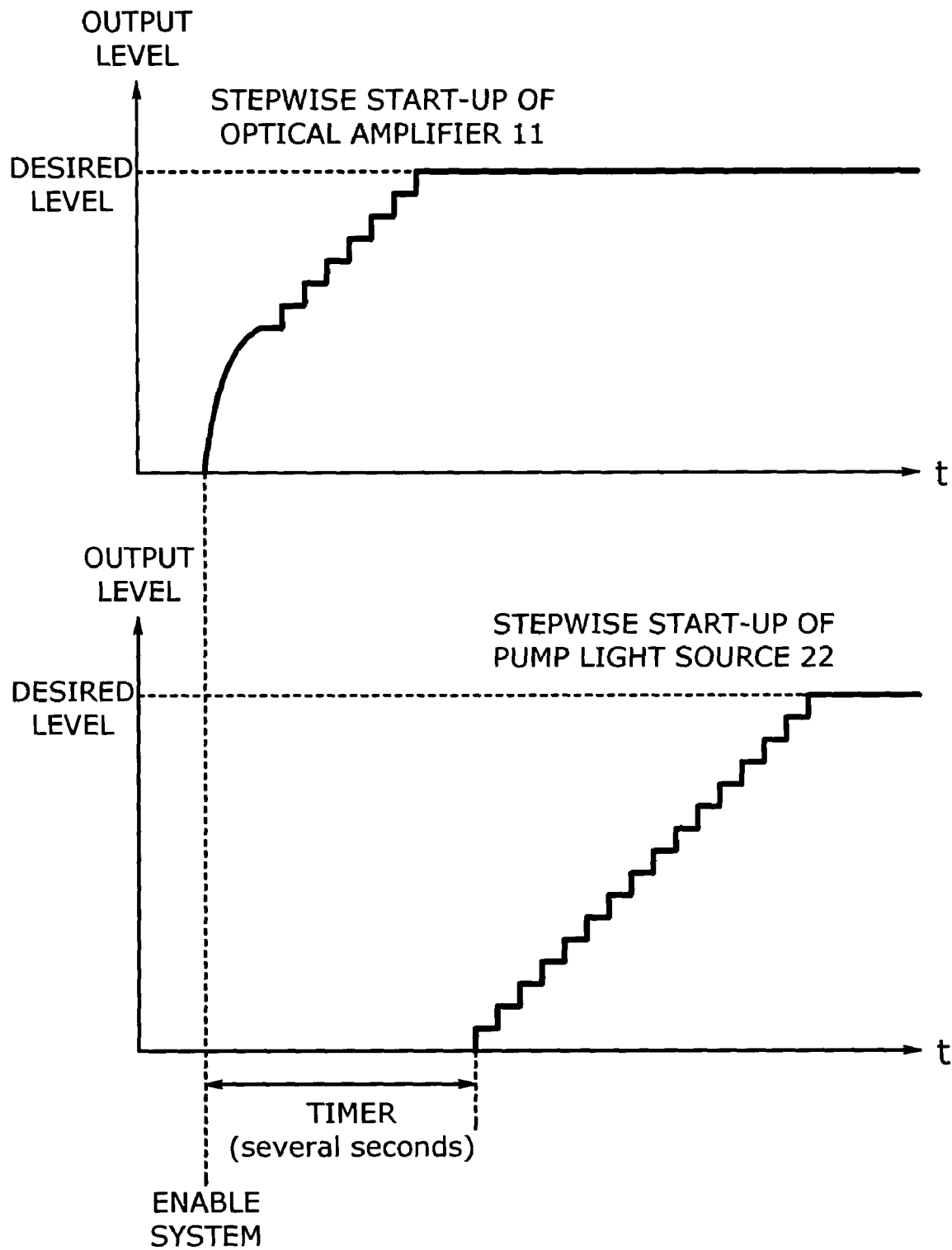
FIG. 14 shows how the start-up timings are controlled with a timer.
Figure 15:
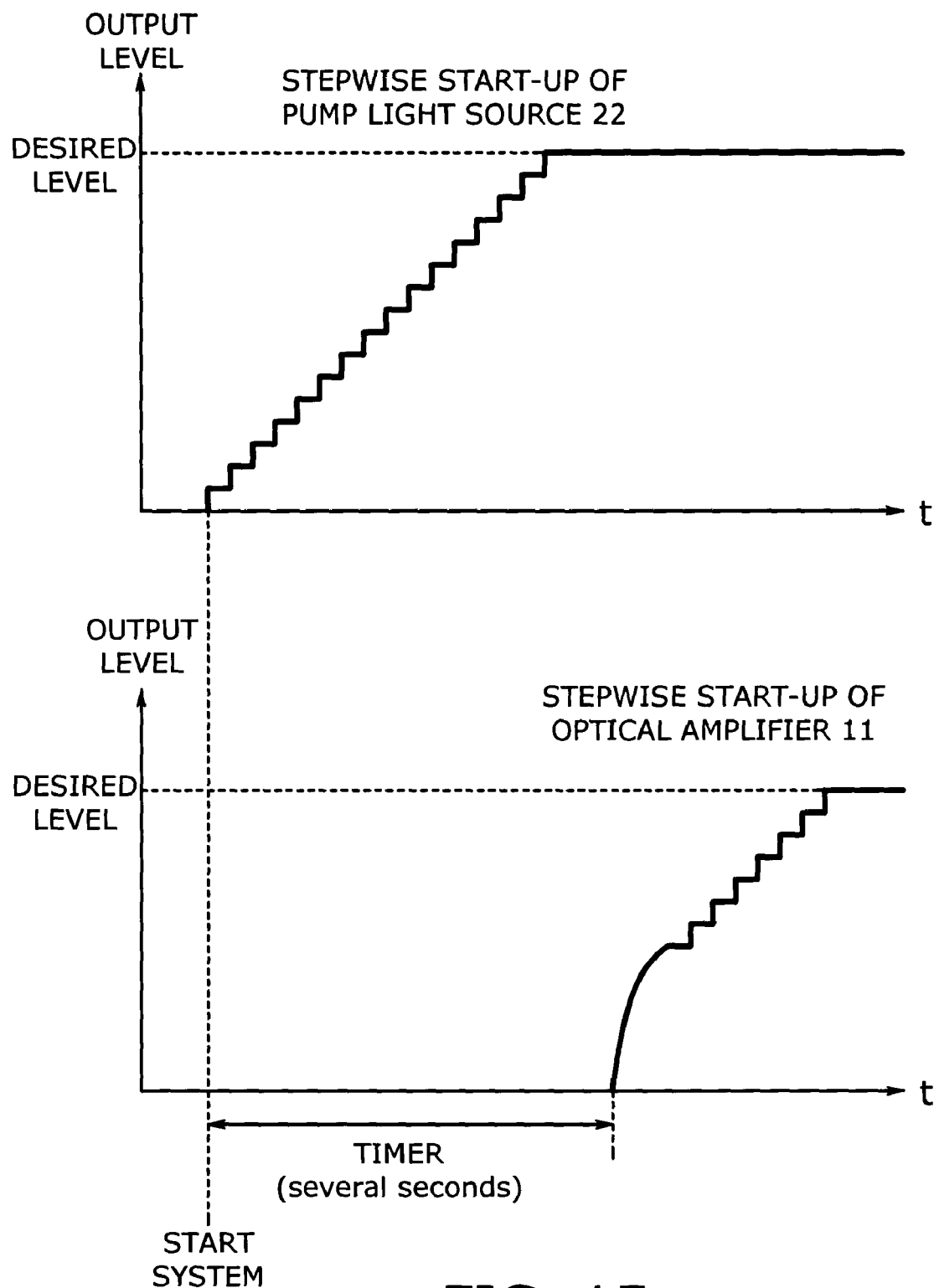
FIG. 15 shows another way to control start-up timings with a timer.

FIGS. 14 and 15 show how the start-up timings are controlled with a timer. Specifically, FIG. 14 shows a case where the optical amplifier 11 starts up first, while FIG. 15 shows a case where the pump light source 22 ramps up first. In the case of FIG. 14, the pump light source controller 23 in the optical receiver 20 is equipped with a timer function that is enabled when the system begins to operate. When this timer reaches a predetermined time count (e.g., several seconds), the pump light source 22 begins to raise its pump beam power in a stepwise manner. That is, the system begins to operate with the optical amplifier 11 alone in the optical transmitter 10, which has no timers, and then with the pump light source 22 that is enabled with a delay time defined by the timer. The required time difference is implemented in this way.

In the case of FIG. 15, the optical amplifier controller 13 in the optical transmitter 10 is equipped with a timer function that is enabled when the system begins to operate. When this timer reaches a predetermined time count (e.g., several seconds), the optical amplifier 11 begins to raise its output power in a stepwise manner under the control of the optical amplifier controller 13. That is, the system begins to operate only with the pump light source 22 in the optical receiver 20, which has no timers, and then with the optical amplifier 11 that is enabled with a delay time defined by the timer. The required time difference is implemented in this way.

Figure 16:
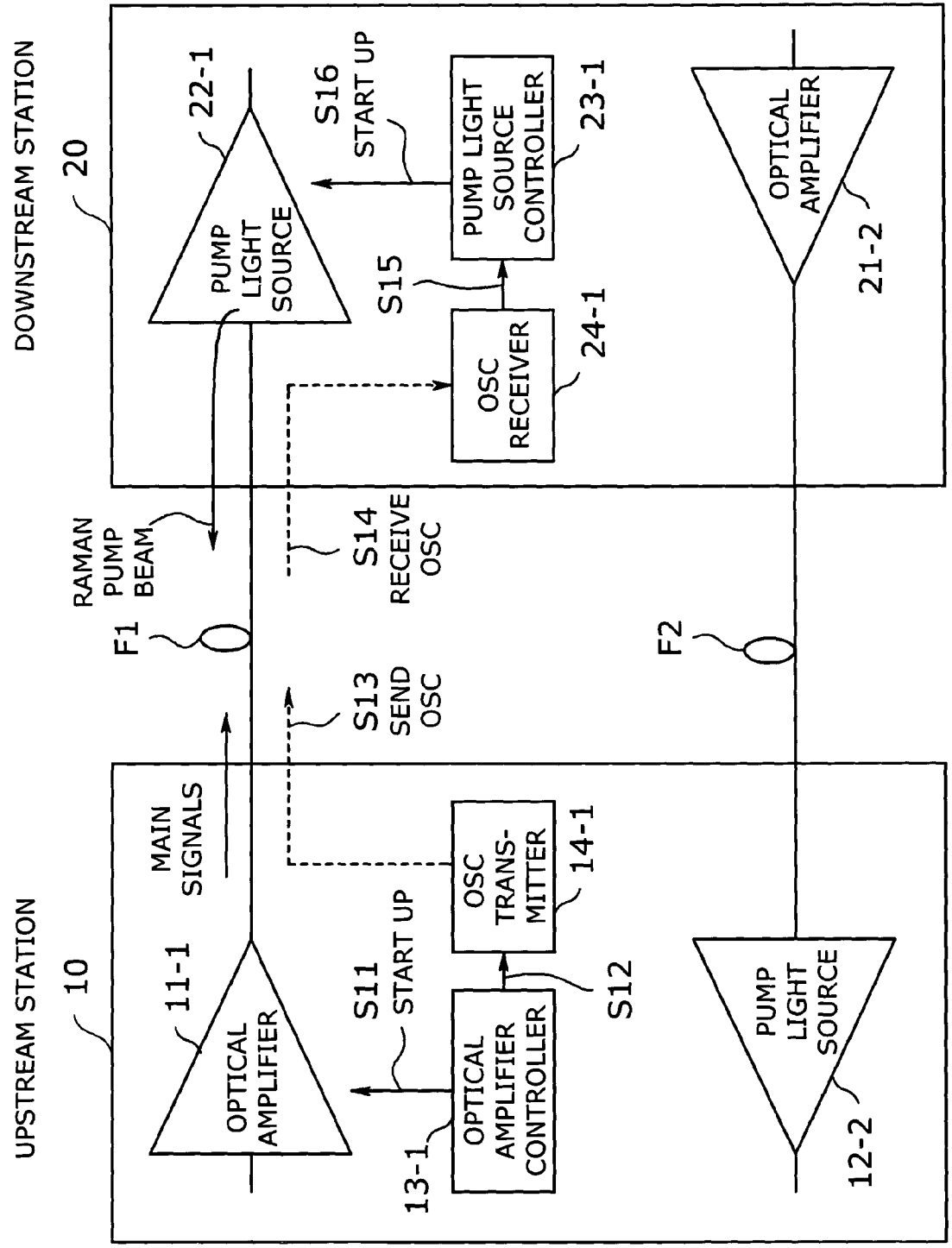
FIG. 16 shows how the two end stations communicate status information through the use of OSC signals.

FIG. 16 shows a system where two end stations communicate status information by exchanging OSC signals, so that an upstream optical amplifier 11-1 will start up first and then a downstream pump light source 22-1. In the illustrated system, the upstream station 10 employs an optical amplifier 11-1, an optical amplifier controller 13-1, and an OSC transmitter 14-1 as part of its downstream link facility, and a pump light source 12-2 as part of its upstream link facility. The downstream station 20, on the other hand, employs a pump light source 22-1, a pump light source controller 23-1, an OSC receiver 24-1 as part of its downstream link facility, and an optical amplifier 21-2 as part of its upstream link facility. The two stations 10 and 20 are interconnected by a downstream fiber-optic transmission line F1 and an upstream fiber-optic transmission line F2. FIG. 16 depicts the following sequence of steps:

(S11) When the system begins to operate, the optical amplifier controller 13-1 in the upstream station 10 starts up the optical amplifier 11 in a stepwise fashion.

(S12) When the output of the optical amplifier 11-1 reaches an intended level, the optical amplifier controller 13-1 notifies the OSC transmitter 14-1 of the completion of start-up control.

(S13) The OSC transmitter 14-1 notifies the downstream station 20 of the completion of start-up control by sending an OSC signal containing that information over the downstream fiber-optic transmission line F1.

(S14) The OSC signal arrives at the OSC receiver 24-1 in the downstream station 20.

(S15) The OSC receiver 24-1 forwards the received OSC signal to the pump light source controller 23-1 after converting it to an electrical signal.

(S16) The electrical signal from the OSC receiver 24-1 makes the pump light source controller 23-1 aware that the optical amplifier 11-1 in the upstream station 10 has fully started up. The pump light source controller 23-1 then enables the pump light source 22-1 so that its output power rises in a stepwise manner.

Figure 17:
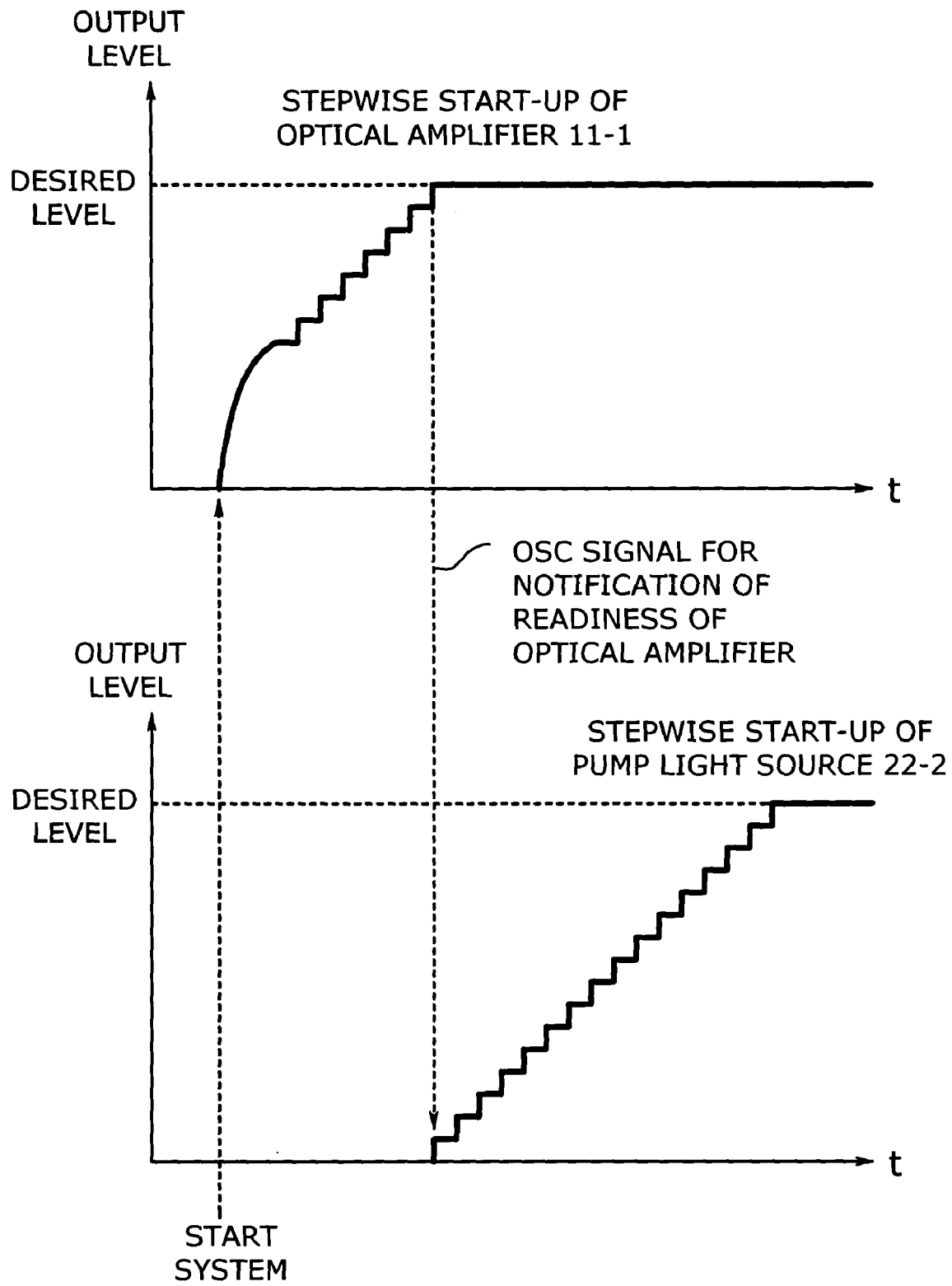
FIG. 17 shows how the start-up timings are controlled by exchanging OSC signals in the system of FIG. 16.

FIG. 17 shows how the start-up timings are controlled through exchange of status information in the system of FIG. 16. As indicated by the downward arrow in this diagram, the upstream station 10 sends an OSC signal downstream when the optical amplifier 11-1 has started up, thereby notifying the downstream station 20 of the completion of control operations performed by the optical amplifier controller 13-1. This OSC notification causes the downstream station 20 to trigger its pump light source controller 23, thus invoking a stepwise start-up process for pump beam power. The start-up timings can be staggered in a more accurate way through exchange of an OSC signal containing such status information between the two stations 10 and 20.

Figure 18:
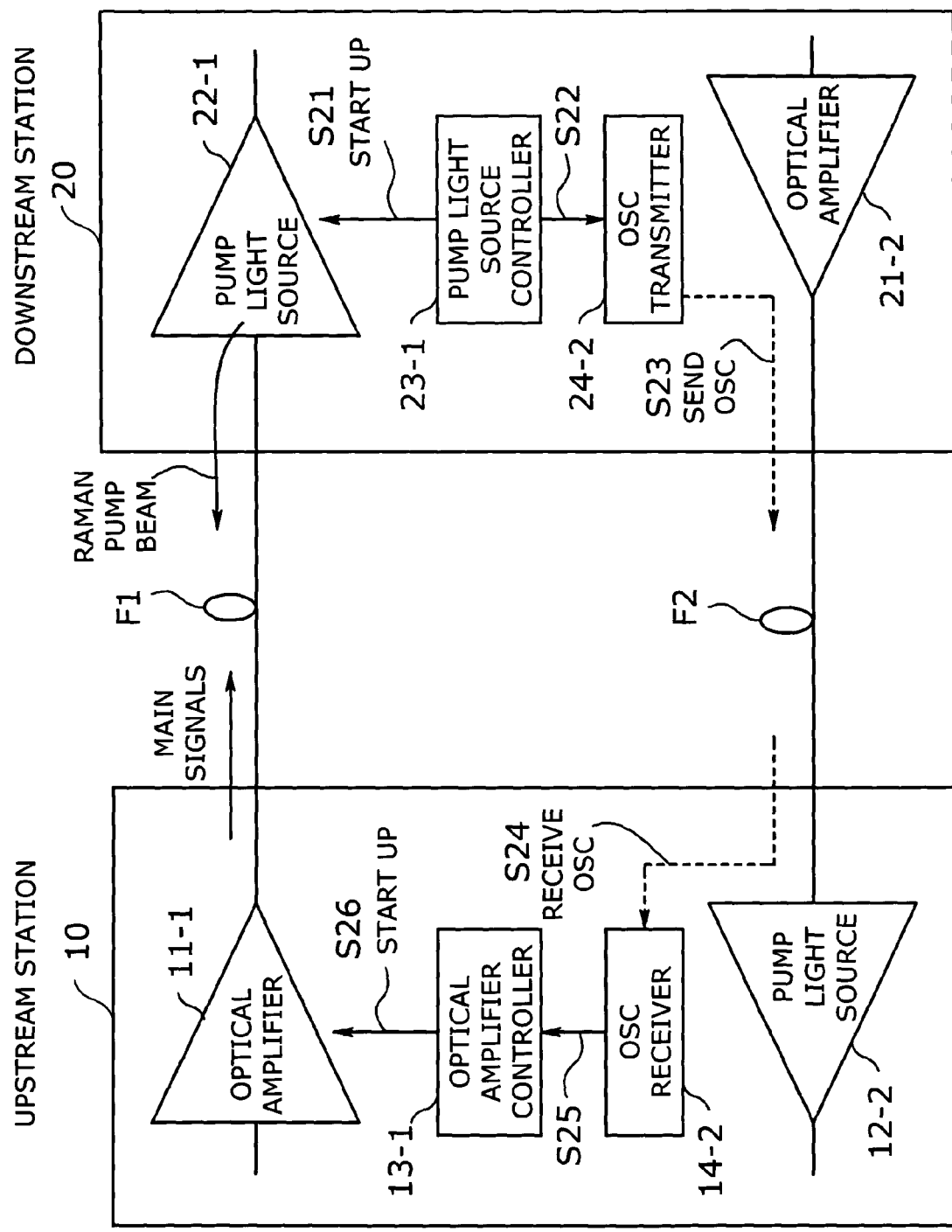
FIG. 18 shows another way of communicating status information through the use of OSC signals.
Figure 19:
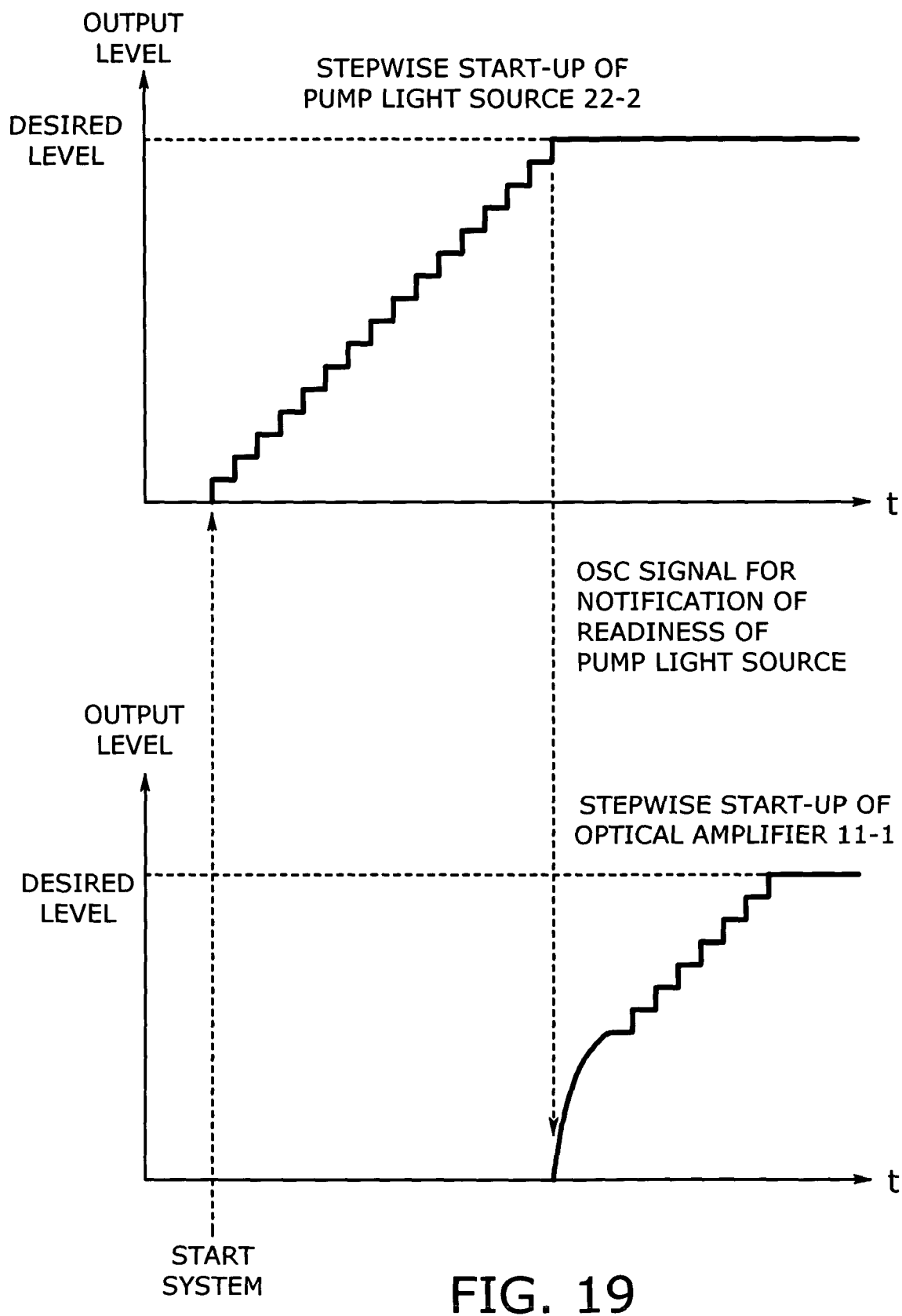
FIG. 19 shows how the start-up timings are controlled by exchanging status information in the system of FIG. 18.

FIG. 18 shows another way of communicating status information using OSC signals. The illustrated system is configured such that a downstream pump light source starts up earlier than an upstream optical amplifier, as opposed to the case of FIG. 16. The upstream station 10 employs an optical amplifier 11-1 and an optical amplifier controller 13-1 as part of its downstream link facility, as well as a pump light source 12-2 and an OSC receiver 14-2 as part of its upstream link facility. The downstream station 20, on the other hand, employs a pump light source 22-1 and pump light source controller 23-1 as part of its downstream link facility, and an optical amplifier 21-2 and OSC transmitter 24-2 as part of its upstream link facility. The two stations 10 and 20 are interconnected by a downstream fiber-optic transmission line F1 and an upstream fiber-optic transmission line F2. FIG. 19 depicts the following sequence of steps:

(S21) When the system begins to operate, the pump light source controller 23-1 in the downstream station 20 controls the pump light source 22-1 so that its pump beam power will rise in a stepwise fashion.

(S22) When the output of the pump light source 22-1 reaches an intended level, the pump light source controller 23-1 signals the OSC transmitter 24-2 that it has completed the start-up control.

(S23) The OSC transmitter 24-2 notifies the upstream station 10 of the completion of start-up control by sending an OSC signal containing that information over the upstream fiber-optic transmission line F2.

(S24) The OSC signal arrives at the OSC receiver 14-2 in the upstream station 10.

(S25) The OSC receiver 14-2 forwards the received OSC signal to the optical amplifier controller 13-1 after converting it into electrical form.

(S26) The electrical signal from the OSC receiver 14-2 makes the optical amplifier controller 13-1 aware that the downstream station 20 has fully started up its pump light source 22-1. The optical amplifier controller 13-1 then enables the optical amplifier 11-1 so that its output power will rise in a stepwise manner.

FIG. 19 shows how the start-up timings are controlled by exchanging status information in the system of FIG. 18. As indicated by the downward arrow in this diagram, the downstream station 20 produces an upstream OSC signal when the pump beam power has reached a required level, thereby notifying the upstream station 10 of the completion of control operations performed by the pump light source controller 23-1. This OSC notification causes the upstream station 10 to trigger its optical amplifier controller 13-1, thus invoking a stepwise start-up process for the optical amplifier 11-1. The start-up timings can be staggered accurately through exchange of an OSC signal containing such status information between the two stations 10 and 20.

Figure 20:
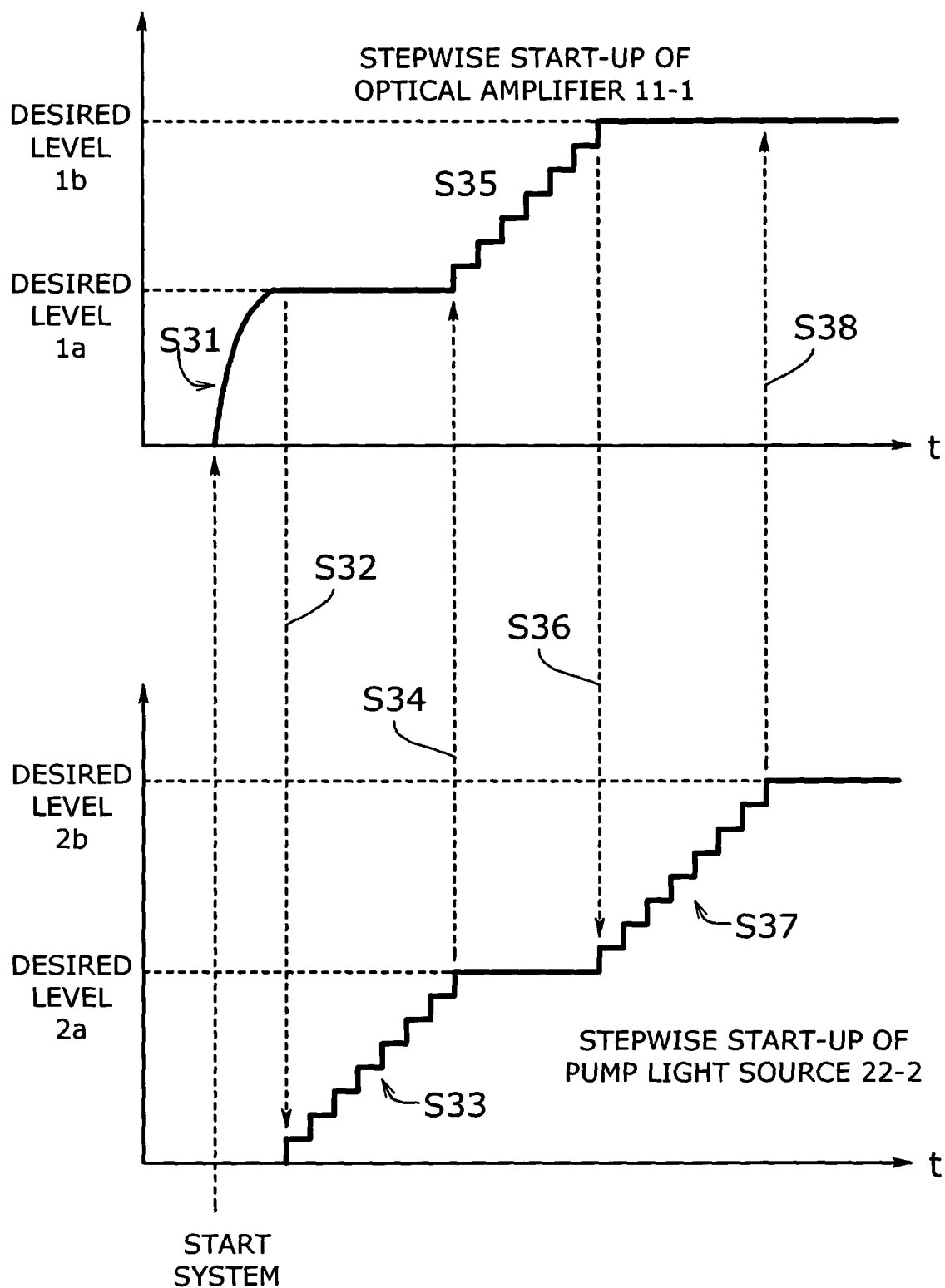
FIG. 20 shows how the two end stations start up while notifying each other of their present status.

According to another aspect of the invention, the upstream and downstream stations 10 and 20 may start up their optical amplifier 11 and pump light source 22 in a more interactive way, sending an OSC signal back and forth to inform each other of their ongoing process status. FIG. 20 shows how the two end stations 10 and 20 perform this type of start-up process, in which:

(S31) When the system starts to operate, the optical amplifier controller 13-1 in the upstream station 10 raises the output power of the optical amplifier 111 in ALC mode, gradually up to a first desired level 1a.

(S32) The upstream station 10 sends a downstream OSC signal to the downstream station 20 to inform it that the output of the upstream optical amplifier 11-1 has increased up to the first desired level 1a.

(S33) The OSC signal produced at step S32 reaches the downstream station 20. The pump light source controller 23-1 then raises the pump beam power of the pump light source 22-1 up to a first desired level 2a in a stepwise manner.

(S34) The downstream station 20 sends an upstream OSC signal to the upstream station 10 to inform it that the pump light source 22-1 has raised its output to the first desired level 2a.

(S35) The OSC signal sent at step S34 makes the upstream station 10 trigger its optical amplifier controller 13-1 to control the variable optical attenuator, so that the optical amplifier 11-1 in AGC mode will raise its output power in a stepwise manner until it reaches a desired final level 1b.

(S36) The upstream station 10 sends another downstream OSC signal to the downstream station 20 to inform it that the output of the upstream optical amplifier 11-1 has reached its desired final level 1b.

(S37) The OSC signal produced at step S36 reaches the downstream station 20. The pump light source controller 23-1 then resumes raising the pump beam power of the pump light source 22-1 in a stepwise manner until it reaches a desired final level 2b.

(S38) The downstream station 20 sends an upstream OSC signal to the upstream station 10 to inform it that the output of the pump light source 22-1 has reached its final level 2b.

As can be seen from the above, the upstream station 10 sends a downstream OSC signal to the downstream station 20 to provide its ongoing process status when the output of the optical amplifier 11-1 has reached, for example, a midpoint level. The downstream station 20 turns on the pump light source 22-1 upon receipt of that OSC signal. When the Raman pump beam has come halfway up, the downstream station 20 notifies the upstream station 10 of that event by transmitting an upstream OSC signal. The upstream station 10 then restarts the start-up process for its optical amplifier 11-1 from the midpoint level to the final level. In this way, the two end stations 10 and 20 execute a stepwise start-up process while balancing their power levels, thus controlling each other's start-up timing more accurately.

According to yet another aspect of the invention, the optical transmission system may be configured in such a way that an upstream station starts up its optical amplifier in a stepwise fashion according to a monitor signal sent from a downstream station. The pump beam power may also be controlled on the basis of monitoring results about the actual level of incoming optical signals.

Figure 21:
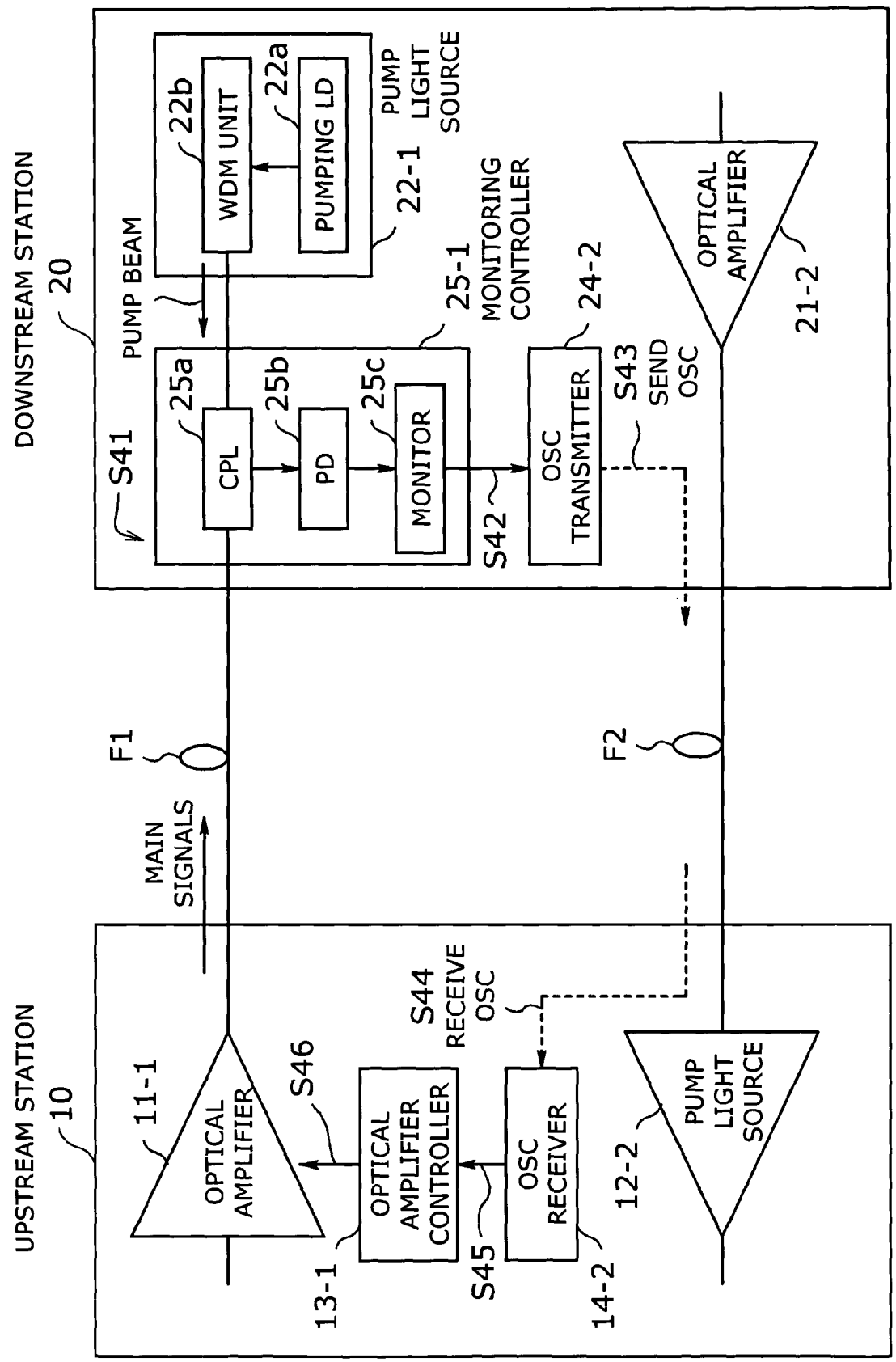
FIG. 21 shows a system where an upstream station starts up its optical amplifier in a stepwise fashion according to a monitor signal sent from a downstream station.

FIG. 21 is a block diagram of a system where an optical amplifier 11-1 is controlled in the way described above. In the illustrated system, the upstream station 10 employs an optical amplifier 11-1 and an optical amplifier controller 13-1 as part of its downstream link facility, and a pump light source 12-2 and an OSC receiver 14-2 as part of its upstream link facility. The downstream station 20, on the other hand, employs a pump light source 22-1 and a monitoring controller 25-1 as part of its downstream link facility, and an optical amplifier 21-2 and an OSC transmitter 24-2 as part of its upstream link facility. The pump light source 22-1 has a pumping laser diode (LD) 22a and a WDM unit 22b. The monitoring controller 25-1 has an optical coupler (CPL) 25a, a photo diode (PD) 25b, and a monitoring unit 25c. The two stations 10 and 20 are interconnected by a downstream fiber-optic transmission line F1 and an upstream fiber-optic transmission line F2.

The system of FIG. 21 goes through the following steps when it starts up:

(S41) In the downstream station 20, the monitoring controller 25-1 watches the level of incoming main signals received through the downstream fiber-optic transmission line F1. More specifically, the optical coupler 25a splits a part of the received light beam, and the photo diode 25b converts it into an analog electrical signal. The monitoring unit 25c then converts the analog signal into digital form for monitoring of signal levels. The monitoring unit 25c uses its integral CPU or FPGA to perform this monitoring operation.

(S42) The monitoring unit 25c supplies the OSC transmitter 24-2 with the above monitoring result in analog signal form.

(S43) The OSC transmitter 24-2 converts the supplied analog signal from electrical form to optical form, thereby producing an upstream OSC signal for transmission over the upstream fiber-optic transmission line F2. This upstream OSC signal contains the monitoring result information for use in the upstream station 10.

(S44) The upstream OSC signal arrives at the OSC receiver 14-2 in the upstream station 10.

(S45) The OSC receiver 14-2 forwards the received upstream OSC signal to the optical amplifier controller 13-1 after converting it to an electrical signal.

(S46) The optical amplifier controller 13-1 receives the electrical signal containing the monitoring result, and with that information, it calculates control step parameters for use in stepwise start-up of the optical amplifier 11-1. The parameters include the number of steps that the control process takes before reaching a desired level. Also included is the time step size, i.e., the interval of control steps.

Figure 22:
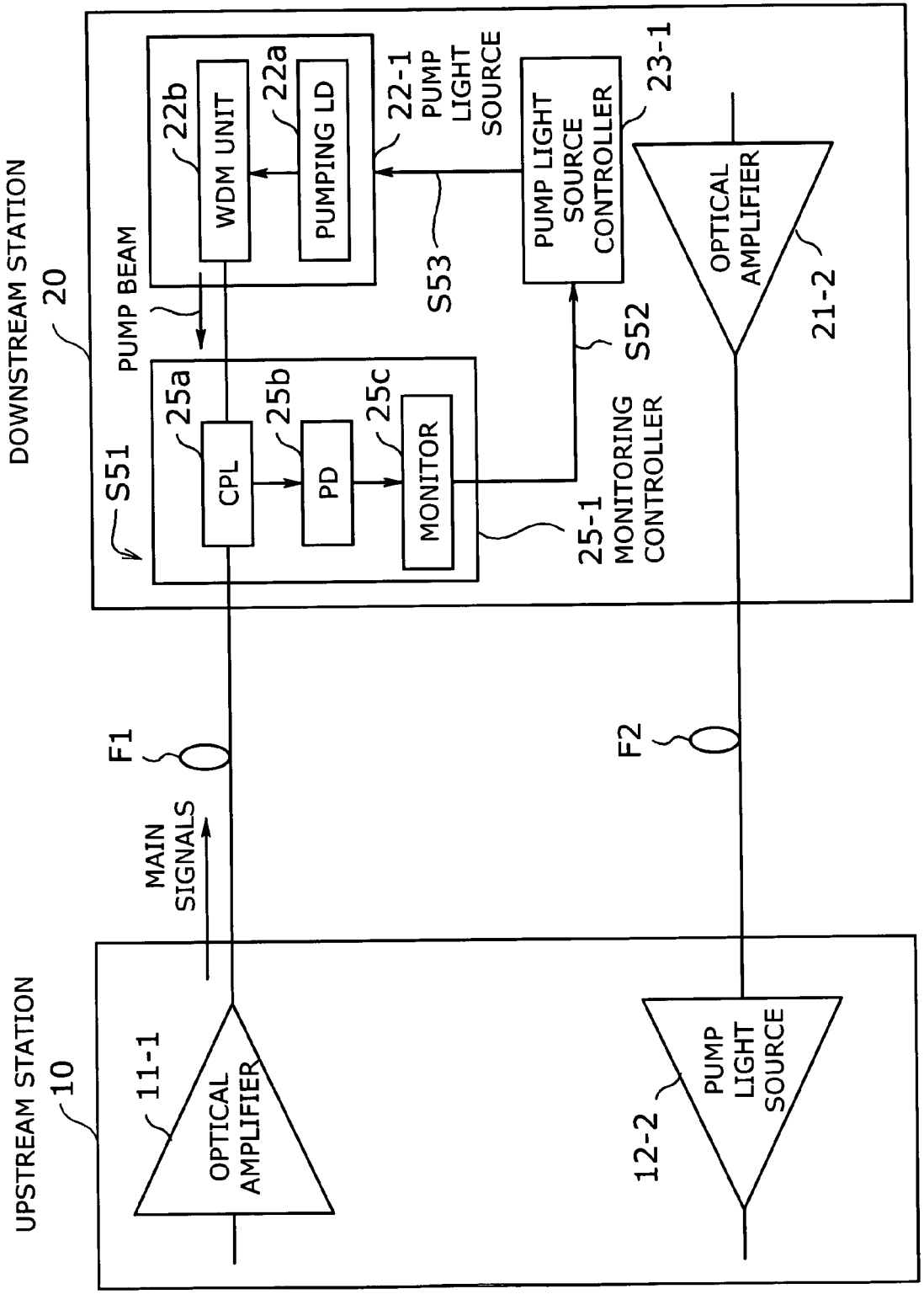
FIG. 22 shows a system where a downstream station starts up its pump light source in a stepwise fashion according to its own monitoring results.

FIG. 22 is a block diagram of a system where a downstream station starts up its pump light source in a stepwise fashion according to its own monitoring results. In the illustrated system, the upstream station 10 employs an optical amplifier 11-1 as part of its downstream link facility, and a pump light source 12-2 as part of its upstream link facility. The downstream station 20, on the other hand, employs a pump light source 22-1, a pump light source controller 23-1, and a monitoring controller 25-1 as part of its downstream link facility, as well as an optical amplifier 21-2 as part of its upstream link facility. The pump light source 22-1 and monitoring controller 25-1 have the same internal structure as what have been explained in FIG. 21. The two stations 10 and 20 are interconnected by a downstream fiber-optic transmission line F1 and an upstream fiber-optic transmission line F2. FIG. 22 depicts the following sequence of steps:

(S51) In the downstream station 20, the monitoring controller 25-1 watches the level of incoming main signals received through the downstream fiber-optic transmission line F1. More specifically, the optical coupler 25a splits a part of the received light beam, and the photo diode 25b converts it into an analog electrical signal. The monitoring unit 25c then converts the analog signal into digital form for monitoring of signal levels. The monitoring unit 25c uses its integral CPU or FPGA to perform this monitoring operation.

(S52) The monitoring unit 25c supplies the pump light source controller 23-1 with the above monitoring result in analog signal form.

(S53) With the monitoring result information, the pump light source controller 23-1 calculates control step parameters for use in starting up the pump light source 22-1 so that its output power will rise in a stepwise fashion. In the pump light source 22-1, the pumping laser diode 22a produces a Raman pump beam according to setup command signals supplied from the pump light source controller 23-1. The WDM unit 22b then routes it into the fiber-optic transmission line F1 for backward Raman pumping.

As can be seen from FIGS. 21 and 22, the two stations raise their amplifier power and pump beam power while calculating control step parameters on the basis of the actual signal levels being monitored. This configuration enables them to execute a stepwise start-up process in a more accurate and reliable way. While the monitoring controller 25-1 in the illustrated systems watches main signal levels, it can also be configured to monitor OSC signal levels or both the main signals and OSC signal.

According to still another aspect of the invention, the optical transmission system has a mask time setting unit that avoids too frequent detection of OSC signal errors. As mentioned earlier, the OSC receiver checks OSC signal frames to determine whether each incoming OSC signal has been received correctly. Some OSC errors have temporary nature in cases where, for example, the frame synchronization is lost due to variations in device characteristics. The problem is that even a temporary error would make the system shut down instantly when it is equipped with APSD functions, reducing the availability of the system unreasonably.

To address the inconvenience described above, the present invention provides a mask time setting unit that defines a mask time during which the system is allowed to neglect temporary OSC signal errors. Errors are detected as being substantial only when they continue for a certain period that exceeds the mask time.

Figure 23:
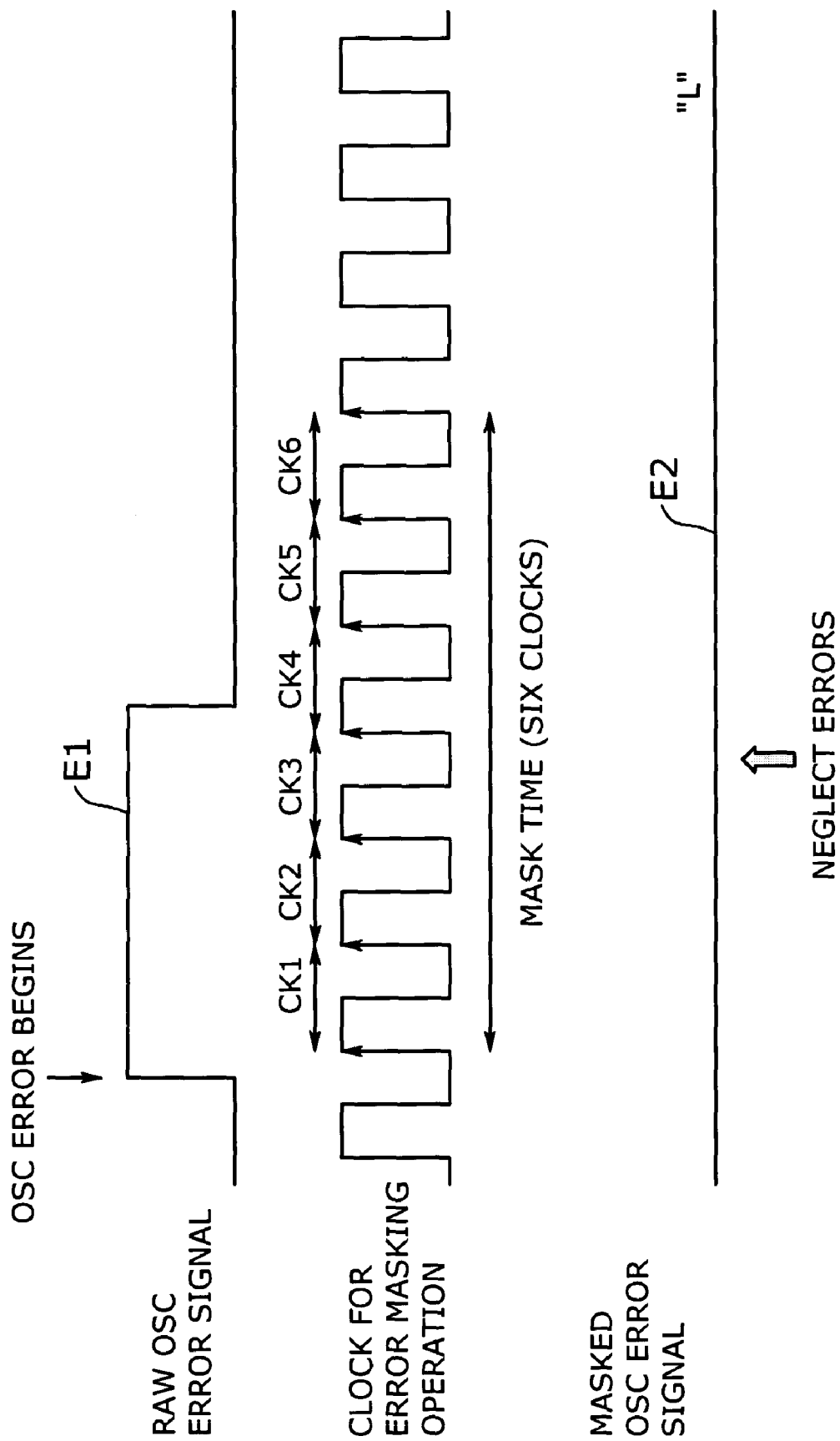
FIGS. 23 and 24 show an example of mask time and how it works when an error occurs.

FIG. 23 shows an example of mask time setting and how it works when an error occurs. This example illustrates a situation where OSC errors (represented as an active-high signal E1) subside within a given mask time, which is set to six cycle periods of a dedicated clock signal for error masking purposes. Shown at the bottom of FIG. 23 is a masked error signal E2 that would be asserted to "high" only when the duration of the raw error signal is active for at least six clocks in a row. As can be seen from the waveforms, the raw OSC error signal E1 is not long enough to be recognized as a substantial OSC error (which must be longer than the six-clock mask time), and thus the masked OSC error signal E2 remains at the low state.

Figure 24:
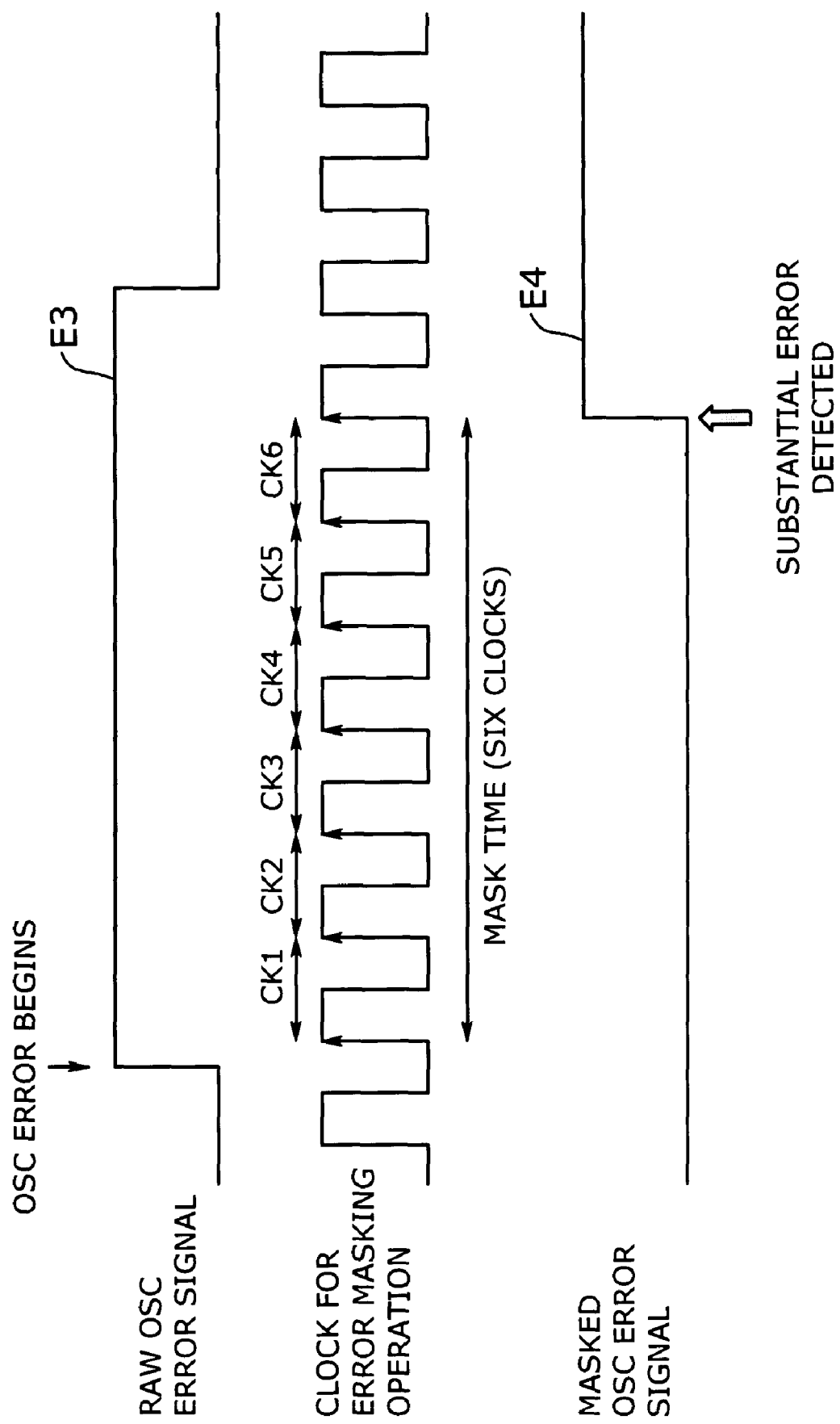

FIG. 24 shows another example of error masking operation, in which continuous OSC faults exceed the mask time threshold and are thus recognized as a true error. As can be seen from the waveforms, the raw OSC error signal E3 is longer than the six-clock mask time. The masked OSC error signal E4 is thus asserted to a high state, indicating that a substantial error has happened. The proposed system operates with a mask time of, for example, 100 milliseconds to 1 second, to neglect short-time fault events. The system brings itself into an error state only when it experiences OSC errors for a predetermined period continuously.

Figure 25:
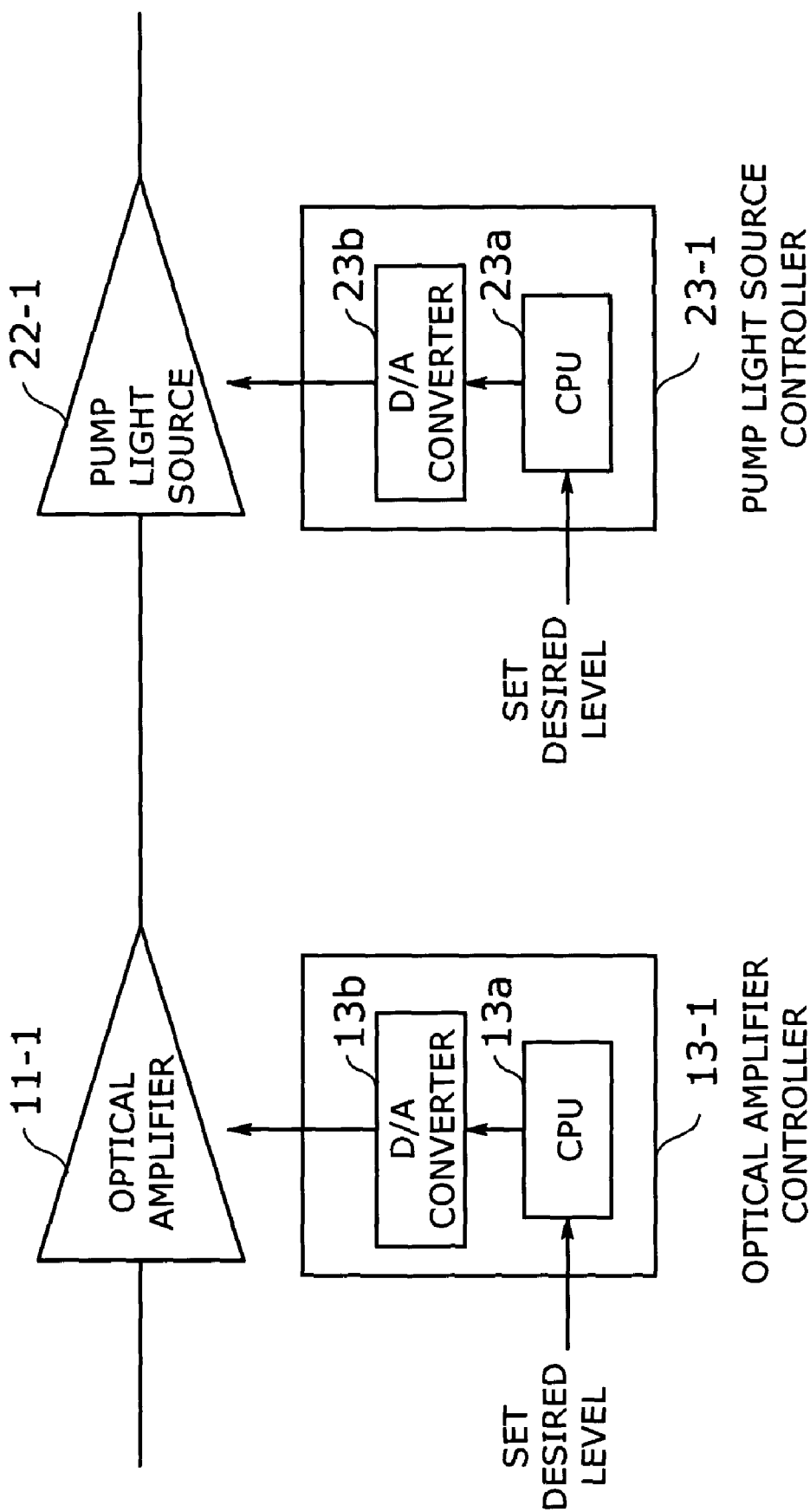
FIG. 25 shows a system where control step parameters are generated through calculation.
Figure 26:
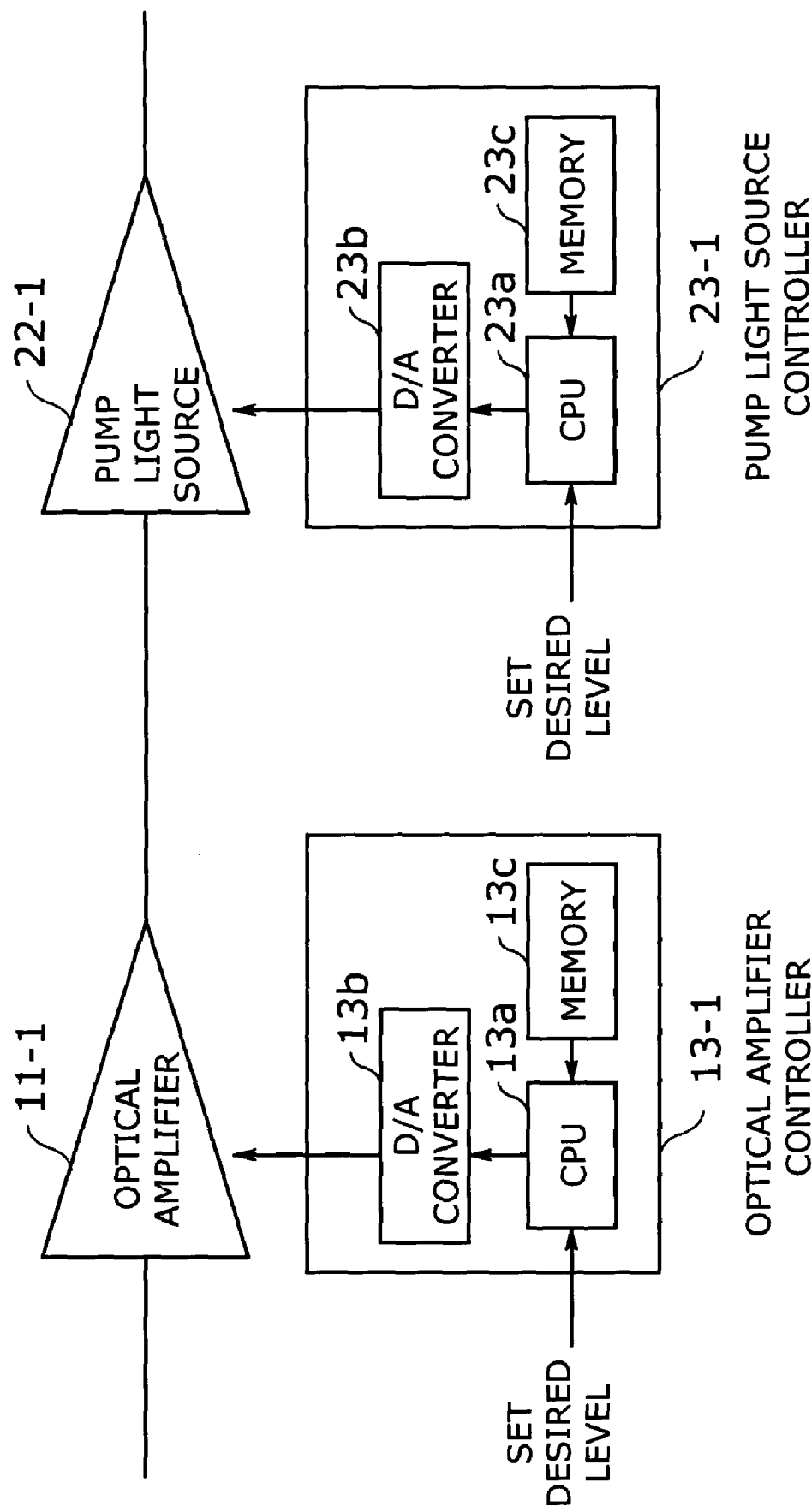
FIG. 26 shows a system where control step parameters are preset in a memory.

Referring to FIGS. 25 and 26, we will now describe how the system sets control parameters when a desired final level is given for stepwise start-up operation. As one method to achieve this, FIG. 25 shows a system where control step parameters are generated through calculation. Here, the optical amplifier controller 13-1 has a CPU (or FPGA) 13a and a digital-to-analog (D/A) converter 13b. When a desired final power level of the optical amplifier 11-1 is given, the CPU 13a automatically calculates necessary control step parameters, considering the number of main signal waves and other related factors. Based on these parameters, the CPU 13a sends an output power control signal to the D/A converter 13b. The D/A converter 13b supplies the optical amplifier 11-1 with the output power control signal after converting it from digital form to analog form.

Similar to the above, the pump light source controller 23-1 includes a CPU (or FPGA) 23a and a D/A converter 23b. When a desired final power level of the pump light source 22-1 is given, the CPU 23a calculates automatically the control step parameters, taking into consideration the number of main signal waves and other related factors. Based on these parameters, the CPU 23a sends a pump beam power control signal to the D/A converter 23b. The D/A converter 23b supplies the pump light source 22-1 with the pump beam power control signal after converting it from digital form to analog form.

FIG. 26 shows a system where the control step parameters are preset in a memory. In the illustrated system, the optical amplifier controller 13-1 has a CPU (or FPGA) 13a, a D/A converter 13b, and a memory 13c. When a desired output power level of the optical amplifier 11-1 is set, the CPU 13a reads out relevant control step parameters from the memory 13c. With those parameters, the CPU 13a produces an output power control signal for use in the D/A converter 13b. The D/A converter 13b supplies the optical amplifier 11-1 with the output power control signal after converting it from digital form to analog form.

Similar to the above, the pump light source controller 23-1 has a CPU (or FPGA) 23a, a D/A converter 23b, and a memory 23c. When a desired pump beam power level of the pump light source 22-1 is set, the CPU 23a reads out corresponding control step parameters from the memory 23c. Based on these parameters, the CPU 23a sends a pump beam power control signal to the D/A converter 23b. The D/A converter 23b supplies the pump light source 22-1 with the pump beam power control signal after converting it from digital form to analog form.

As can be seen from the preceding discussion, the present invention provides various mechanisms that help an optical transmission system to avoid abrupt variations of Raman gain, which could affect OSC signals. Stepwise ramp-up of optical amplifiers prevents OSC signal errors from happening, thus permitting an optical transmission system to start in a stable way even when it has APSD functions. With the proposed start-up mechanisms, the system can recover from an OSC signal error and its consequent shutdown, because no further OSC errors will happen during the restart sequence. The present invention provides a mask time during which the system can operate without triggering its APSD functions even if some OSC faults are detected temporarily. This mask time prevents the system from being too sensitive OSC signal conditions.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical transmission system which transports optical signals over an optical transmission line, comprising:
   (a) an optical transmitter, comprising:
   optical amplifying means for amplifying main signals, and
   optical amplifying control means for starting up said optical amplifying means, waiting a first predetermined time to raise output power of said optical amplifying means up to a desired level, in order to prevent an OSC signal from experiencing abrupt power variations; and (b) an optical receiver, comprising:

pump light emitting means for producing a pump light for injection to the optical transmission line so as to make the optical transmission line serve as an amplifying medium, and pump light emitting control means for starting up said pump light emitting means, waiting a second predetermined time to raise the pump light to a desired power level, in order to prevent the OSC signal from experiencing abrupt power variations;

wherein said pump light emitting control means comprises a timer with a predetermined time constant that is enabled when the optical transmission system starts to operate; and said pump light emitting control means starts to raise the pump light in a stepwise fashion after said timer has expired, whereby said pump light emitting means starts up later than said optical amplifying means.

2. The optical transmission system according to claim 1, further comprising a variable optical attenuator disposed before said optical amplifying means to vary input signal level thereof, wherein:

said optical amplifying means is controlled in both automatic level control (ALC) and automatic gain control (AGC) modes;

said optical amplifying control means controls said optical amplifier in the ALC mode to raise the output power thereof from zero level; and after said optical amplifying means has moved into the AGC mode, said optical amplifier controller controls the input signal level of said optical amplifying means by varying attenuation level of said variable optical attenuator, thereby controlling the output power of said optical amplifying means.

3. The optical transmission system according to claim 1, further comprising a variable optical attenuator disposed before said optical amplifying means in said optical transmitter to vary input signal level thereof, wherein:

said optical amplifying means is controlled in AGC mode; and said optical amplifying control means first sets a maximum attenuation level to said variable optical attenuator and then gradually reduces the attenuation level, thereby increasing the output power of said optical amplifying means in a stepwise fashion.

4. The optical transmission system according to claim 1, wherein:

said optical transmitter sends a downstream OSC signal to said optical receiver to indicate that said optical amplifier controller has finished raising the output power of said optical amplifying means; and said pump light emitting control means starts to raise the pump light in a stepwise fashion upon receipt of the downstream OSC signal.

5. The optical transmission system according to claim 1, wherein:

said optical receiver sends an upstream OSC signal to said optical transmitter to indicate that said pump light emitting control means has finished raising the pump light; and said optical amplifying control means starts to raise the output power of said optical amplifying means in a stepwise fashion upon receipt of the upstream OSC signal.

6. The optical transmission system according to claim 1, wherein said optical amplifying control means and said pump light emitting control means respectively start up said optical amplifying means and said pump light emitting means in an interactive way, communicating each other's ongoing process status by sending OSC signals back and forth.

7. The optical transmission system according to claim 1, wherein:

said optical receiver comprises monitoring control means for watching at least one of main signal power and OSC signal power;

said optical receiver sends an upstream OSC signal to notify said optical transmitter of monitoring results of said monitoring control means; and based on the monitoring results received from said optical receiver, said optical amplifying control means calculates control step parameters for use in raising the output power of said optical amplifying means in a stepwise fashion.

8. The optical transmission system according to claim 1, wherein:

said optical receiver comprises a monitoring control means that watches at least one of main signal power and OSC signal power; and based on monitoring results of said monitoring control means, said pump light emitting control means calculates control step parameters for use in raising the pump light in a stepwise fashion.

9. The optical transmission system according to claim 1, wherein said optical transmitter and said optical receiver each comprise a mask time setting means that defines and uses a mask time in checking incoming OSC signals in such a way that a substantial OSC error is detected only when OSC signal faults continue for a period longer than the mask time.

10. The optical transmission system according to claim 1, wherein said optical amplifying control means calculates control step parameters from the desired level of said optical amplifying when raising the output power in a stepwise fashion.

11. The optical transmission system according to claim 1, wherein:

said optical amplifying control means comprises a memory that stores control step parameters to achieve the desired level of said optical amplifying means; and said optical amplifying control means reads out the control step parameters from said memory when raising the output power of said optical amplifying means in a stepwise fashion.

12. The optical transmission system according to claim 1, wherein said pump light emitting control means calculates control step parameters from the desired power level of the pump light when raising the pump light in a stepwise fashion.

13. The optical transmission system according to claim 1, wherein:

said pump light emitting control means comprises a memory that stores control step parameters to achieve the desired power level of the pump light; and said pump light emitting control means reads out the control step parameters from said memory when raising the pump light in a stepwise fashion.

14. An optical transmission system which transports optical signals between upstream and downstream stations over an optical transmission line, each station comprising:

optical amplifying means for amplifying main signals;

optical amplifying control means for starting up said optical transmitter, waiting a first predetermined time to raise output power of said optical amplifying means up to a desired level, in order to prevent an OSC signal from experiencing abrupt power variations;

a pump light emitting means for producing a pump light for injection to the optical transmission line so as to make the optical transmission line serve as an amplifying medium; and a pump light emitting control means for starting up said pump light emitting means, waiting a second predetermined time to raise the pump light to a desired power level, in order to prevent the OSC signal from experiencing abrupt power variations;

wherein said pump light emitting control means comprises a timer with a predetermined time constant that is enabled when the optical transmission system starts to operate; and said pump light emitting control means starts to raise the pump light in a stepwise fashion after said timer has expired, whereby said pump light emitting means in the downstream station starts up later than said optical amplifying means in the upstream station.

15. The optical transmission system according to claim 14, further comprising a variable optical attenuator disposed before said optical amplifying means to vary input signal level thereof, wherein:

said optical amplifying means is controlled in both ALC and AGC modes;

said optical amplifying control means controls said optical amplifying means in the ALC mode to raise the output power thereof from zero level; and after said optical amplifying means has moved into the AGC mode, said optical amplifying control means controls the input signal level of said optical amplifying means by varying attenuation level of said variable optical attenuator, thereby controlling the output power of said optical amplifying means.

16. The optical transmission system according to claim 14, further comprising a variable optical attenuator disposed before said optical amplifying means to vary input signal level thereof, wherein:

said optical amplifying means is controlled in AGC mode; and said optical amplifying control means first sets a maximum attenuation level to said variable optical attenuator and then gradually reduces the attenuation level, thereby increasing the output power of said optical amplifying means in a stepwise fashion.

17. The optical transmission system according to claim 14, wherein:

said optical amplifying control means in the upstream station sends a downstream OSC signal to the downstream station to indicate that said optical amplifying control means has finished raising the output power of said optical amplifying means; and in the downstream station, said pump light emitting control means starts to raise the pump light in a stepwise fashion upon receipt of the downstream OSC signal.

18. The optical transmission system according to claim 14, wherein;

said pump light emitting control means in the downstream station sends an upstream OSC signal to the upstream station to indicate that said pump light emitting control means has finished raising the pump light; and in the upstream station, said optical amplifying control means starts to raise the output power of said optical amplifying means in a stepwise fashion upon receipt of the upstream OSC signal.

19. The optical transmission system according to claim 14, wherein said optical amplifying control means and said pump light emitting control means in the upstream and downstream stations respectively start up said optical amplifying means and said pump light emitting means in an interactive way, communicating each other's ongoing process status by sending OSC signals back and forth.

20. The optical transmission system according to claim 14, wherein:

each station further comprises a-monitoring control means for watching at least one of main signal power and OSC signal power;

the downstream station sends an upstream OSC signal to notify the upstream station of monitoring results of said monitoring control means; and in the upstream station, said optical amplifying control means calculates control step parameters, based on the monitoring results received from the downstream station, for use in raising the output power of said optical amplifying means in a stepwise fashion.

21. The optical transmission system according to claim 14, wherein:

each station further comprises a monitoring control means that watches at least one of main signal power and OSC signal power; and said pump light emitting control means calculates control step parameters, based on monitoring results provided by said monitoring control means, for use in raising the pump light in a stepwise fashion.

22. The optical transmission system according to claim 14, wherein each station further comprises a mask time setting means that defines and uses a mask time in checking incoming OSC signals in such a way that a substantial OSC error is detected only when OSC signal faults continue for a period longer than the mask time.

23. The optical transmission system according to claim 14, wherein said optical amplifying control means calculates control step parameters from the desired level of said optical amplifying means when raising the output power in a stepwise fashion.

24. The optical transmission system according to claim 14, wherein:

said optical amplifying control means comprises a memory that stores control step parameters to achieve the desired level of said optical amplifying means; and said optical amplifying control means reads out the control step parameters from said memory when raising the output power of said optical amplifying means in a stepwise fashion.

25. The optical transmission system according to claim 14, wherein said pump light emitting control means calculates control step parameters from the desired power level of the pump light when raising the pump light in a stepwise fashion.

26. The optical transmission system according to claim 14, wherein:

said pump light emitting control means comprises a memory that stores control step parameters to achieve the desired power level of the pump light; and said pump light emitting control means reads out the control step parameters from said memory when raising the pump light in a stepwise fashion.

27. A method of suppressing temporary OSC signal errors, comprising:
  starting up an optical amplifying means, spending a first predetermined time to raise output power of the optical amplifying means up to a desired level, in order to prevent an OSC signal from experiencing abrupt power variations, wherein the optical amplifying means is a device that amplifies main signals; and
  starting up a pump light emitting means, spending a second predetermined time to raise a pump light to a desired power level, in order to prevent the OSC signal from experiencing abrupt power variations, wherein the pump light emitting means is a device that produces the pump light for injection to an optical transmission line so as to make the optical transmission line serve as an amplifying medium.

28. The method according to claim 27, wherein starting up the optical amplifying means and the pump light emitting means are executed at different times.

29. A method of suppressing optical supervisory signal errors, comprising:
  raising output power of an optical amplifier up to a desired level in a stepwise fashion, the optical amplifier being disposed in an optical transmitter to amplify main optical signals for transport over a downstream optical transmission line;
  raising a pump light to a desired power level in a stepwise fashion, the pump lights being produced by a pump light source disposed in an optical receiver for injection to the downstream optical transmission line so as to cause Raman amplification;
  monitoring power levels of at least one of an incoming main optical signal and an incoming optical supervisory signal that the optical receiver receives;
  transmitting the result of said monitoring from the optical receiver to the optical transmitter by using an optical supervisory signal over an upstream optic transmission line; and
  determining the number and interval of steps in said stepwise raising of the output power of the optical amplifier, based on the result of said monitoring,
  enabling a first timer having a predetermined time constant, when the optical transmitter starts to operate;
  starting an optical amplifier controller raising the output power of said optical amplifier in a stepwise fashion after said first timer has expired; and
  enabling a second timer having a predetermined time constant, when the optical transmitter starts to operate;
  starting a pump light source controller raising the pump light in a stepwise fashion after said second timer has expired, whereby said pump light source starts up later than said optical amplifier.

30. A method of suppressing optical supervisory signal errors, comprising:
  raising output power of an optical amplifier up to a desired level in a stepwise fashion, the optical amplifier being disposed in an optical transmitter to amplify main optical signals for transport over downstream fiber-optic transmission line;
  raising a pump beam to a desired power level in a stepwise fashion, the pump beams being produced by a pump light source disposed in an optical receiver for injection to the downstream fiber-optic transmission line so as to cause Raman amplification;
  monitoring power levels of at least one of an incoming main optical signal and an incoming optical supervisory signal that the optical receiver receives; and
  determining the number and interval of steps in said stepwise raising of the pump beam, based on the result of said monitoring.

31. A method of suppressing optical supervisory signal errors, comprising:
  raising output power of an optical amplifier up to a desired level in a stepwise fashion, the optical amplifier being disposed in an optical transmitter to amplify main optical signals for transport over a downstream optical transmission line;
  raising a pump light to a desired power level in a stepwise fashion, the pump lights being produced by a pump light source disposed in an optical receiver for injection to the downstream optical transmission line so as to cause Raman amplification;
  monitoring power levels of at least one of an incoming main optical signal and an incoming optical supervisory signal that the optical receiver receives;
  notifying the optical transmitter of completion of said stepwise raising of the pump light by sending an optical supervisory signal over an upstream -optic transmission line; and
  determining the number and interval of steps in said stepwise raising of the output power of the optical amplifier and in said stepwise raising of the pump light, based on the result of said monitoring;
  enabling a first timer having a predetermined time constant, when the optical transmitter starts to operate;
  starting an optical amplifier controller raising the output power of said optical amplifier in a stepwise fashion after said first timer has expired; and
  enabling a second timer having a predetermined time constant, when the optical transmitter starts to operate;
  starting a pump light source controller raising the pump light in a stepwise fashion after said second timer has expired, whereby said pump light source starts up later than said optical amplifier.

32. A method of suppressing optical supervisory signal errors, comprising:
  raising output power of an optical amplifier up to a desired level in a stepwise fashion, the optical amplifier being disposed in an optical transmitter to amplify main optical signals for transport over a downstream optical transmission line;
  raising a pump light to a desired power level in a stepwise fashion, the pump lights being produced by a pump light source disposed in an optical receiver for injection to the downstream optical transmission line so as to cause Raman amplification;
  monitoring power levels of at least one of an incoming main optical signal and an incoming main optical supervisory signal that the optical receiver receives;
  transmitting the result of said monitoring from the optical receiver to the optical transmitter by using an optical supervisory signal over an upstream optical transmission line; and
  determining the number and interval of steps in said stepwise raising of the output power of the optical amplifier and in said stepwise raising of the pump light, based on the result of said monitoring;
  enabling a first timer having a predetermined time constant, when the optical transmitter starts to operate;
  starting an optical amplifier controller raising the output power of said optical amplifier in a stepwise fashion after said first timer has expired; and
  enabling a second timer having a predetermined time constant, when the optical transmitter starts to operate;

starting a pump light source controller raising the pump light in a stepwise fashion after said second timer has expired, whereby said pump light source starts up later than said optical amplifier;

wherein the sending end and receiving end perform said stepwise raising of the output power and pump beam, respectively, while exchanging each other's ongoing process status by sending optical supervisory signals back and forth over the upstream and downstream optical transmission lines.

33. The optical transmission system according to claim 1, wherein:

said optical amplifying control means comprises a timer with a predetermined time constant that is enabled when the optical transmission system starts to operate; and said optical amplifying control means starts to raise the output power of said optical amplifying means in a stepwise fashion after said timer has expired, whereby said optical amplifying means starts up later than said pump light emitting means.

34. The optical transmission system according to claim 14, wherein:

said optical amplifying control means comprises a timer with a predetermined time constant that is enabled when the optical transmission system starts to operate, and said optical amplifying control means starts to raise the output power of said optical amplifying means in a stepwise fashion after said timer has expired, whereby said optical amplifying means in one station starts up later than said pump light emitting means in the other station.

\* \* \* \* \*

UNITED STATES PATENT AND TRADEMARK OFFICE
CERTIFICATE OF CORRECTION

| | |
|---|---|
| PATENT NO. | : 7,251,072 B2 |
| APPLICATION NO. | : 10/635723 |
| DATED | : July 31, 2007 |
| INVENTOR(S) | : Toshihiro Ohtani et al. |

It is certified that error appears in the above-identified patent and that said Letters Patent is hereby corrected as shown below:

IN THE CLAIMS SECTION

Column 19, line 63, delete "wherein;" and replace with --wherein:--

Column 20, line 14, delete "a-monitoring" and replace with --monitoring--

Column 21, line 37, delete "optic" and replace with --optical--

Signed and Sealed this

Twenty-ninth Day of April, 2008

JON W. DUDAS
*Director of the United States Patent and Trademark Office*